(12) United States Patent
Kunishige

(10) Patent No.: US 9,210,318 B2
(45) Date of Patent: Dec. 8, 2015

(54) IMAGING DEVICE AND IMAGING METHOD

(71) Applicant: Olympus Imaging Corp., Shibuya-ku, Tokyo (JP)

(72) Inventor: Keiji Kunishige, Hachioji (JP)

(73) Assignee: Olympus Corporation, Tokyo (JP)

( * ) Notice: Subject to any disclaimer, the term of this patent is extended or adjusted under 35 U.S.C. 154(b) by 53 days.

(21) Appl. No.: 14/060,599

(22) Filed: Oct. 22, 2013

(65) Prior Publication Data
US 2014/0104483 A1    Apr. 17, 2014

Related U.S. Application Data

(63) Continuation of application No. PCT/JP2012/060318, filed on Apr. 17, 2012.

(30) Foreign Application Priority Data

Apr. 23, 2011  (JP) .................................. 2011-096648

(51) Int. Cl.
| | | |
|---|---|---|
| H04N 5/262 | (2006.01) | |
| H04N 5/232 | (2006.01) | |
| G02B 7/36 | (2006.01) | |

(52) U.S. Cl.
CPC ............ H04N 5/23219 (2013.01); G02B 7/365 (2013.01); H04N 5/23212 (2013.01); H04N 5/23293 (2013.01)

(58) Field of Classification Search
USPC ........... 348/239, 345, 348, 349; 382/116–118
See application file for complete search history.

(56) References Cited

U.S. PATENT DOCUMENTS

| | | | | |
|---|---|---|---|---|
| 6,891,550 | B1* | 5/2005 | Nolan ........................... | 345/619 |
| 2003/0052988 | A1* | 3/2003 | Kurosawa ..................... | 348/360 |
| 2003/0071908 | A1* | 4/2003 | Sannoh et al. ................ | 348/345 |
| 2008/0013799 | A1* | 1/2008 | Steinberg et al. ............. | 382/118 |

(Continued)

FOREIGN PATENT DOCUMENTS

| | | |
|---|---|---|
| JP | 2002-006203 | 1/2002 |
| JP | 2002-162559 | 6/2002 |
| JP | 2005-038083 | 2/2005 |

(Continued)

OTHER PUBLICATIONS

International Search Report to International Application No. PCT/JP2012/060138, mailed on Jul. 10, 2012.

*Primary Examiner* — Sinh Tran
*Assistant Examiner* — Zhenzhen Wu
(74) *Attorney, Agent, or Firm* — John C. Pokotylo; Straub & Pokotylo

(57) ABSTRACT

An imaging device of the present invention comprises a facial organ detection section for detecting eyes from a digital image, an eye-priority AF section for setting an AF region to a detected eye and focusing on the eye, and an image processing section for carrying out image processing on the digital image to feather the periphery of an eye that the eye-priority AF section has focused on, wherein the facial organ detection section detects facial organs from a digital image that has been captured by the imaging section, and determines inclination of a face based on the detected facial organs, the eye-priority AF section selects one eye based on the inclination of the face, and carries out focusing on the selected eye, and the image processing section carries out processing to feather eyes that have not been selected, and varies feathering strength in accordance with inclination of the face.

18 Claims, 20 Drawing Sheets

(56) References Cited

U.S. PATENT DOCUMENTS

| | | | |
|---|---|---|---|
| 2008/0278587 A1* | 11/2008 | Izawa | 348/207.11 |
| 2008/0284901 A1* | 11/2008 | Misawa | 348/349 |
| 2009/0231420 A1 | 9/2009 | Kokufu et al. | |
| 2009/0262987 A1* | 10/2009 | Ioffe et al. | 382/118 |
| 2010/0079617 A1* | 4/2010 | Kosaka | 348/229.1 |

FOREIGN PATENT DOCUMENTS

| | | |
|---|---|---|
| JP | 2010-054587 | 3/2010 |
| JP | 2010-127995 | 6/2010 |

* cited by examiner

FIG. 6A
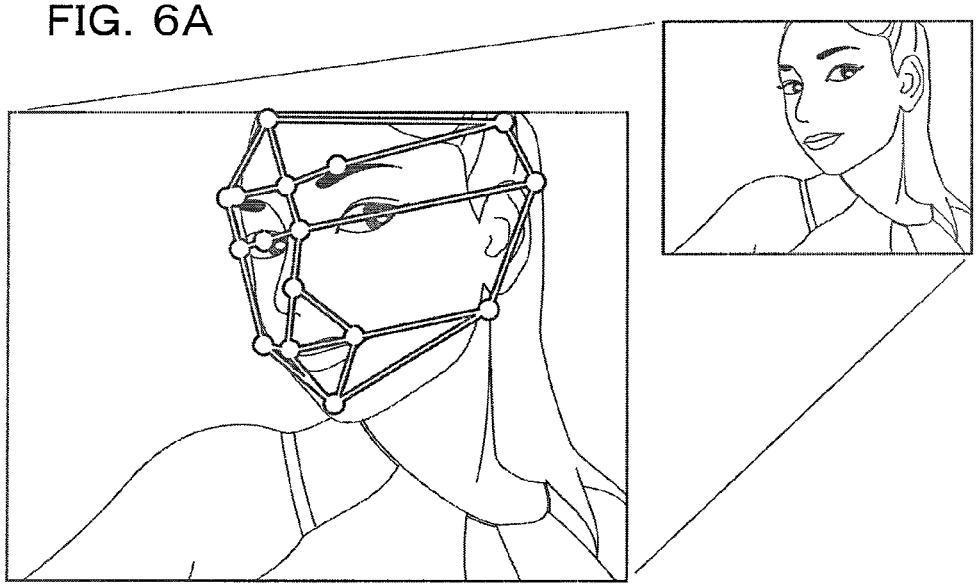
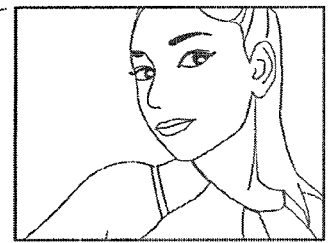
FIG. 6B
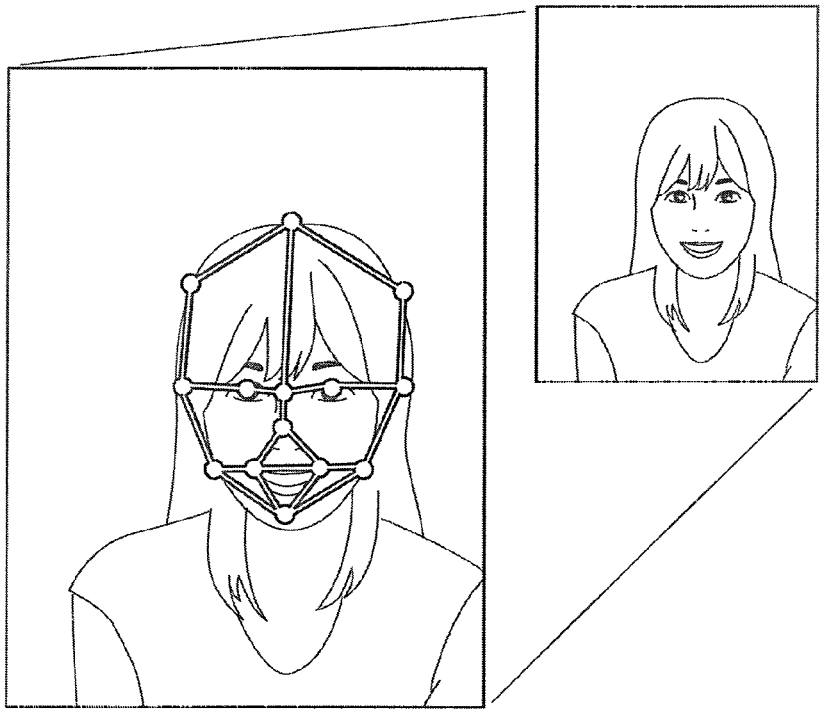

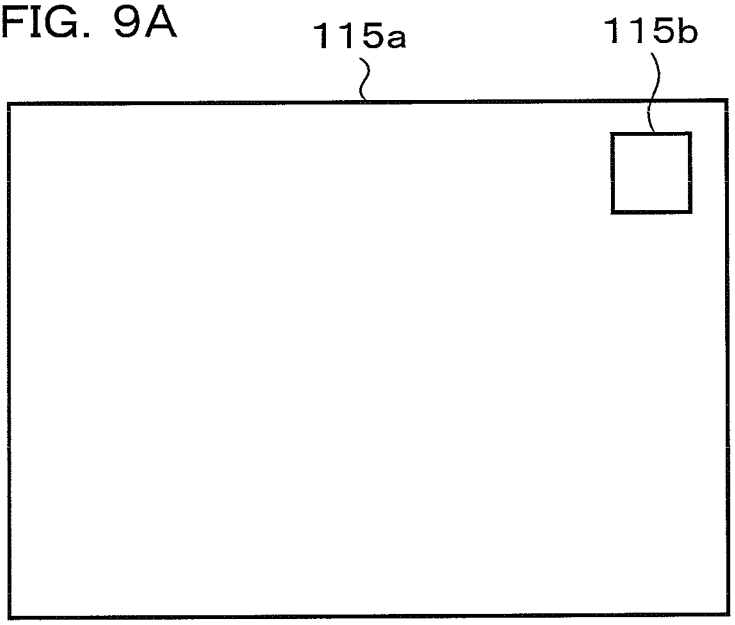
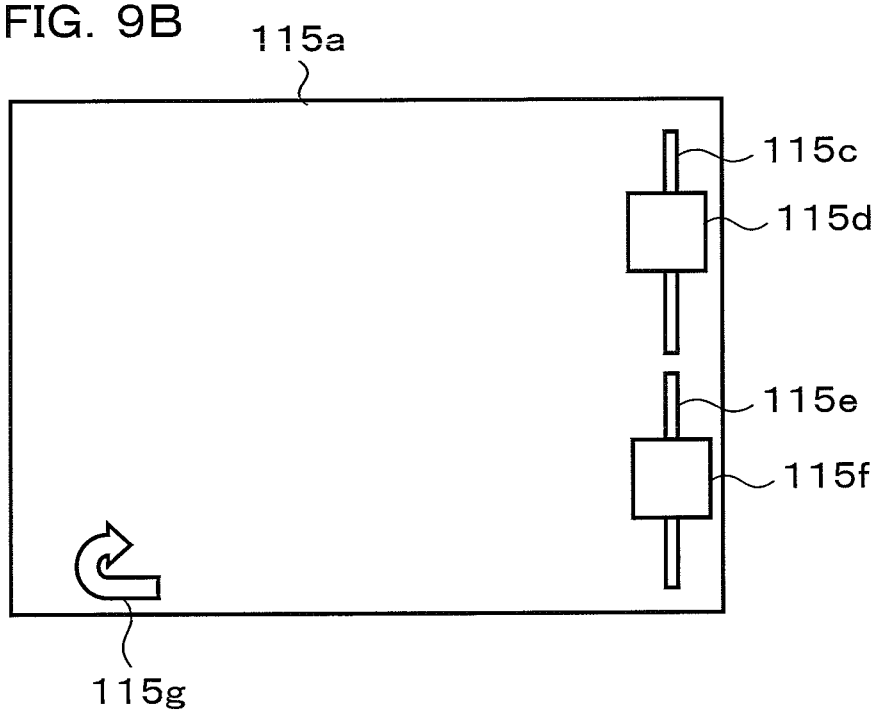

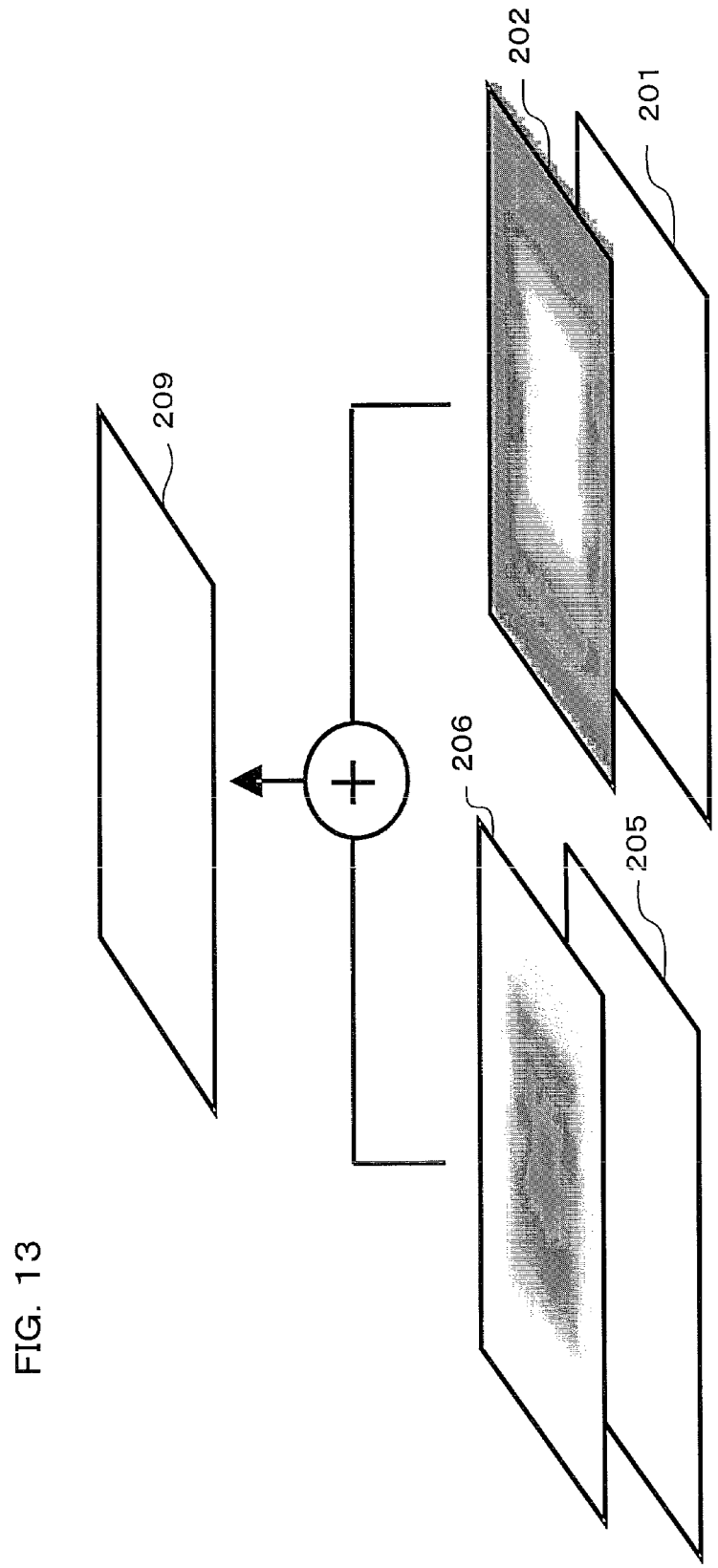

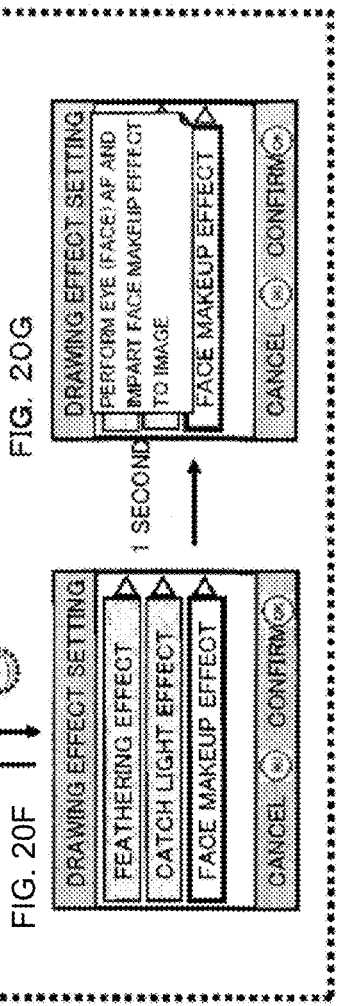

IMAGING DEVICE AND IMAGING METHOD

CROSS-REFERENCE TO RELATED APPLICATIONS

This application is a Continuation application of PCT Application No. PCT/JP2012/060318, filed on Apr. 17, 2012 and based upon and claiming the benefit of priority from prior Japanese Patent Application No. 2011-096648, filed on Apr. 23, 2011, the entire contents of all of which are incorporated herein by reference.

BACKGROUND OF THE INVENTION

1. Field of the Invention

The present invention relates to an imaging device and an imaging method, and in detail relates to an imaging device such as a camera, and an imaging method, capable of automatically focusing on the eyes of a person or animal that are a subject.

2. Description of the Related Art

Generally, an automatic focus detection unit of an imaging device such as a digital camera carries out focusing so that contrast of a taken image becomes its highest value. In recent years automatic focus detection units have additionally been provided with a face detection function, and facial AF is known, where, in the event that a face is detected, focusing is carried out to a position where an average value of contrast for the overall detected face region becomes highest. A function to focus on only eyes that have been detected within the face region (hereafter referred to as eye priority AF) has also recently become known. For example, an imaging device that focuses on the eyes at the time of portrait shooting is disclosed in Japanese patent laid-open No. 2002-6203 (hereafter referred to as patent document 1) and Japanese patent laid-open No. 2002-162559 (hereafter referred to as patent document 2).

SUMMARY OF THE INVENTION

The present invention has been conceived in view of the above-described situation, and has as its object to provide an imaging device, and an imaging method, that can simply capture images having a drawing effect relating to the eyes, without complicated settings, even with a lens having a high wide-open F number (slow lens).

The present invention relates to an imaging device, having an imaging section, capable of capturing digital images, comprising a facial organ detection section for detecting facial eyes from a digital image that has been taken by the imaging section, an eye priority AF section for setting an AF region to a detected eye and focusing on the eye, and an image processing section for carrying out image processing on the digital image to feather around an eye that the eye priority AF section has focused on, wherein the facial organ detection section detects facial organs from a digital image that has been captured by the imaging section, and determines inclination of a face based on the detected facial organs, the eye priority AF section selects one eye based on the inclination of the face, and carries out focusing on the selected eye, and the image processing section carries out processing to feather eyes that have not been selected, and varies feathering strength in accordance with inclination of the face.

Also, an imaging method of the present invention, for an imaging device capable of capturing digital images by detecting an eye from a captured digital image, focusing on the detected eye, and carrying out image processing on the digital image to feather around the eye that has been focused on, comprises detecting facial organs from the digital image and determining inclination of a face based on the detected facial organs, selecting one eye based on the inclination of the face, and carrying out focusing on the selected eye, and carrying out processing to feather eyes that have not been selected, and varies feathering strength in accordance with inclination of the face.

BRIEF DESCRIPTION OF THE DRAWINGS

FIG. 6A and FIG. 6B are drawings for describing the manner in which eye priority AF frames are selected, with the camera of one embodiment of the present invention.

FIG. 9A and FIG. 9B are drawings showing icons that appear at the time of touch detection processing, such as a feathering icon, with the camera of one embodiment of the present invention.

FIG. 13 is a drawing for explaining combination of an original image and a feathered image, with the camera of one embodiment of the present invention.

FIG. 20A-FIG. 20G are drawings showing examples of eye photographing setting menus of one embodiment of the present invention.

DETAILED DESCRIPTION OF THE PREFERRED EMBODIMENTS

These and other features, aspects, and advantages of the of the apparatus and methods of the present invention will become better understood with reference to the following description, appended claims, and accompanying drawings.

Preferred embodiments using a camera to which the present invention has been applied will be described in the following in accordance with the drawings. A camera of one embodiment of the present invention is a digital camera, and has an imaging section, with a subject image being converted to image data by this imaging section, and the subject image then being subjected to live view display on a display section 115 arranged on a rear surface based on this converted image data. A photographer determines composition and photo opportunity by looking at the live view display.

At the time of a first release, if a person is included in a subject, automatic focus adjustment is carried out for a photographing lens so as to focus on the eyes or face of a person. At the time of a second release image data is stored to an installed storage medium (external memory 114). In the case where one eye of a person has been focused on, the other eye that has not been focused on, or the other eye and the periphery of that eye, are subjected to feathering processing. Image data that has been stored in the storage medium can be played back and displayed on the display section 115 if playback mode is selected.

Figure 1:
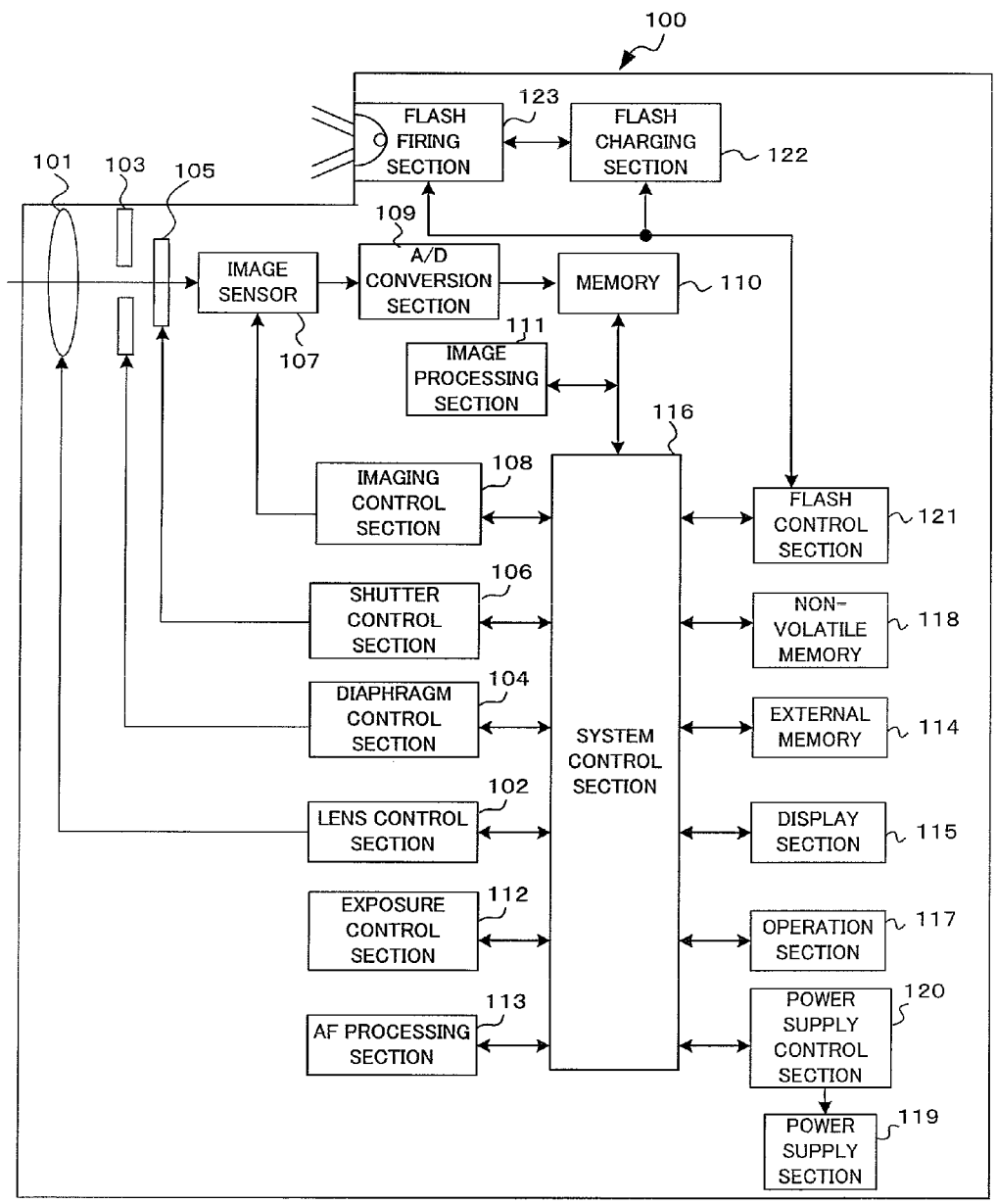
FIG. 1 is a block diagram mainly showing the electrical structure of a camera of one embodiment of the present invention.

FIG. 1 is a block diagram mainly showing the electrical structure of a camera 100 of one embodiment of the present invention. A diaphragm 103, shutter 105 and image sensor 107 are arranged on the optical axis of a photographing lens 101. Output of the image sensor 107 is connected to an A/D converter section 109, and output of the A/D converter section 109 is connected to a memory 110. The memory 110 is connected to an image processing section 111 and a system control section 116.

An imaging control section 108, shutter control section 106, diaphragm control section 104, lens control section 102, exposure control section 112, AF processing section 113, flash control section 121, non-volatile memory 118, external memory 114, display section 115, operation section 117 and power supply control section 120 are respectively connected to the system control section 116.

The above described imaging control section 108 is connected to the image sensor 107, the shutter control section 106 is connected to the shutter 105, the diaphragm control section 104 is connected to the diaphragm 103, and the lens control section 102 is connected to the photographing lens 101. Also, the power supply control section 120 is connected to a power supply section 119, and the flash control section 121 is respectively connected to a flash charging section 122 and a flash firing section 123.

The photographing lens 101 is an optical system for concentrating subject light flux onto the image sensor 107, to form a subject image. This photographing lens 101 has its focus state varied by being moved in the optical axis direction by the lens control section 102 that operates in response to commands from the system control section 116.

The diaphragm 103 adjusts an amount of incident light of the subject light flux that is to be incident on the image sensor 107 through the photographing lens 101. The diaphragm 103 has its opening amount controlled by the diaphragm control section 104 that operates in response to instructions from the system control section 116. The diaphragm control section 104 and the system control section 116 function as an aperture value setting section for setting the aperture value at the time of exposure to a specified value close to the wide-open F number, in the case where focusing has been carried out on an eye by an eye priority AF section, which will be described later.

The shutter 105 performs opening and closing for light flux of a subject image formed by the photographing lens 101, and is constructed using a well-known lens shutter or focal plane shutter etc. The shutter 105 has its open time (shutter speed value) controlled by the shutter control section 106 that operates in response to instructions from the system control section 116.

The image sensor 107 is a two-dimensional image sensor such as a CMOS image sensor or a CCD image sensor, and comprises Bayer array color filters arranged on a front surface, and photoelectric conversion elements such as photodiodes arranged in correspondence with the color filters. An image region is constituted by pixel groups made up of each color filter and its corresponding photoelectric conversion element. The image sensor 107 receives light that has been focused by the photographing lens 101 at each pixel and performs photoelectric conversion, stores this photoelectric current in a condenser, and outputs to the A/D converter section 109 as an analog voltage signal (image signal). The imaging control section 108 carries out operational control of the image sensor 107 in response to instructions from the system control section 116.

The A/D converter section 109 converts an analog voltage signal (image signal) output from the image sensor 107 into a digital image signal (image data). The memory 110 is a storage section for temporarily storing various data, such as image data acquired in the A/D converter section 109 and image data that has been subjected to processing by the image processing section 111. In this specification, as long as a signal is based on an image signal output from the image sensor 107 it will be referred to as image data, and this includes image processed signals, not only a signal that has been subjected to A/D conversion by the A/D converter section 109.

The image processing section 111 reads out image data that has been temporarily stored in the memory 110, and carries out image processing such as white balance correction processing, demosaicing processing and color conversion processing on this image data. The image processing section 111 also carries out image compression at the time of storage in the external memory 114, which will be described later, and expansion of compressed image data that has been read out from the external memory 114.

Also, the image processing section 111 functions as a face detection section, and detects faces within a subject based on image data. When a face has been detected, the position and size of the face are also detected. The image processing section 111 also acts as a facial organ detection section, and performs detection of organs within a face such as eyes, nose and mouth, corners of the mouth, and pupils. Here, in the case where organs such as eyes and pupils are detected, the position and size of the respective left and right eyes are also detected, and inclination of the face is also detected based on the position etc. of these organs.

Also, the image processing section 111 carries out feathering processing on the original image and creates a feathered image. Also, the image processing section 111 creates α channel mask patterns (refer to FIG. 11A, FIG. 11B, FIG. 12A and FIG. 12B), which will be described later, and carries out combination processing for the α channel mask patterns and the feathered image. The image processing section 111 also carries out image processing to feather around the eye that has been focused on by the eye priority AF section that will be described later, or the eye that has not been focused on. As feathering processing, as well as that just described, image processing is also carried out to feather around a region that contains the eye that has been focused on and one of either the left or right corners of the mouth corresponding to the position of the eye that has been focused on.

The image processing section 111 also carries out image processing to feather with an increased feathering intensity in accordance with a distance on the image from the eye that has been focused on by the eye priority AF section. The image processing section 111 also carries out image processing to feather with increased feathering intensity in accordance with a distance, on the image, from a region that contains the eye that the eye priority AF section as focused on and one of either the left or right corners of the mouth corresponding to the position of the eye that has been focused on. The image processing section 111 also carries out image processing to superimpose a catch light pattern, such as a cross, star, or crescent etc. within the eye of a person, in the case where catch light effect has been set.

The exposure control section 112 calculates subject brightness (brightness of a scene containing the subject) using image data temporarily stored in the memory 110. There is obviously no problem in calculating subject brightness using a dedicated photosensor.

The AF (Auto Focus) processing section 113 extracts signals for high frequency components from image data temporarily stored in the memory 110, and acquires a contrast value using integration processing. The system control section 116 carries out drive control so as to bring the photographing lens 101 to its focused position, by means of the lens control section 102, based on the contrast value. In obtaining the contrast value, while it possible to obtain a value for the entire screen, it is also possible to obtain a contrast value based on image data corresponding to an AF frame that has been set.

Also, the AF processing section 113 and the system control section 116 function as an eye priority AF section for setting an AF region to an eye that has been detected by the facial organ detection section, and focusing on the eye. Also, the eye priority AF section selects the nearer, namely the larger, of left and right eyes that have been detected by the facial organ detection section and focuses on the selected eye.

Figure 2:
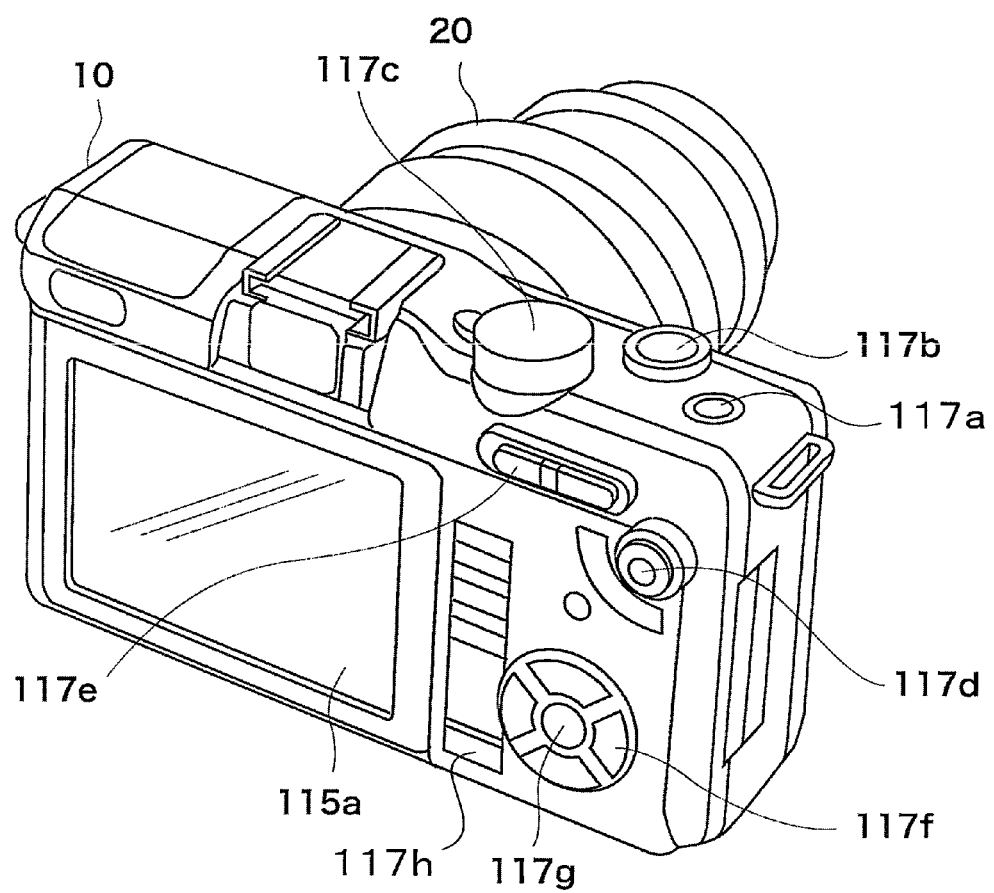
FIG. 2 is an external perspective drawing looking from a rear surface of a camera of one embodiment of the present invention.

The operation section 117 includes operation members, such as a power supply button 117a, a release button 117b, a shooting mode dial 117c, a movie button 117d, a function button 117e, a cross-shaped button 117f, an OK button 117g, a menu button 117h and various input keys, as shown in FIG. 2. If a user operates any of the operation members of the operation section 117, the system control section 116 executes various sequences according to the user operation.

The power supply button 117a within the operation section 117 is an operation member for instructing to turn a power supply of the camera 100 on or off, and if the power supply button 117a is pressed the power supply of the system control section 116 is turned on, while if it is pressed again the power supply is turned off.

The release button 117b has a two-stage switch with a first release switch and a second release switch. If the release button 117b is pressed down halfway, the first release switch is turned on, and if the release button is pressed down further from the halfway point to a fully pressed state the second release switch is turned on. If the first release switch is turned on, the system control section 116 executes shooting preparation sequences such as AE processing and AF processing. Also, if the second release switch is turned on, the system control section 116 executes a shooting sequence for still pictures and takes a picture.

The system control section 116 is constituted by an ASIC (Application Specific Integrated Circuit) including a CPU (Central Processing Unit) etc., and performs overall control of various sequences of the camera 100 such as for the imaging control section 108 and the flash control section 121.

The external memory 114 is, for example, a storage medium that is inserted into and taken out of the camera body, and stores image data that has been compressed in the image processing section 111, and its associated data. Image data that has been stored is also read out and playback displayed on the display section 115. A storage medium for storing image data etc. is not limited to one that is inserted into or removed from the camera body, and can be a storage medium such as a hard disk built in to the camera body.

The display section 115 includes a liquid crystal monitor 115a (refer to FIG. 2) or the like arranged on a rear surface of the camera body or the like, and live view display is carried out based on image data. The display section 115 also carries out playback display of taken images that have been stored in the external memory 114, and carries out display of menu screens for setting such as exposure control values or display and shooting modes etc. The display section 115 is not limited to a liquid crystal monitor as long as it can display images etc., and may also be a display such as organic EL.

Setting for carrying out effect application, such as a feathering effect or catch light effect in eye drawing effect mode, is carried out using menu screens of the display section 115. As a catch light pattern there are shapes such as a cross, star or crescent, and at the time of catch light effect setting the pattern shape is also set. Details of effect setting for the eye drawing effect mode will be described later using FIG. 20A-FIG. 20G. Also, in a case where a touch panel is provided on the front surface of the display monitor 115a and the panel is touched by the user's finger etc., information on the touched position is output to the system control section 116.

The non-volatile memory 118 is an electrically rewritable non-volatile memory, and stores various parameters that are required for operation of the camera 100. The non-volatile memory 118 also stores programs executed by the system control section 116. The system control section 116 reads out parameters stored in the non-volatile memory 118, and executes various sequences, in accordance with programs stored in the non-volatile memory 118.

The power supply section 119 supplies power necessary for operation of each section of the camera 100, and is constituted by, for example, a power supply battery such as a secondary cell. The power supply control section 120 performs control of the power supply section 119, such as detecting power supply voltage and remaining capacity of the battery constituting the power supply section 119.

The flash control section 121 controls a charging operation of the flash charging section 122, and a firing operation of the flash firing section 123, in accordance with instructions from the system control section 116. The flash charging section 122 comprises a boost circuit for boosting the power supply voltage of the power supply section 119, and a capacitor for holding energy at the voltage boosted by the boost circuit, and holds the energy required to fire the flash firing section 123. The flash firing section 123 is provided with an arc tube such as a xenon (Xe) tube for example, and a reflecting hood, and fires using the energy held in the capacitor of the flash charging section 122 when a firing instructing is received from the flash control section 121.

Next, external appearance of the camera 100 of this embodiment will be described using FIG. 2. FIG. 2 is an external perspective drawing of the camera 100 looking from the rear surface, and shows an interchangeable lens 20 fitted to the camera body 10. The power supply button 117a, release button 117b and shooting mode dial 117c are arranged on an upper surface of the camera body 10.

Also, a liquid crystal monitor 115a is arranged on the rear surface of the camera body 10, and various displays such as live view display of a subject image or menu screen display, playback display of a stored image etc. are carried out using this liquid crystal monitor 115a. The movie button 117d and function button 117e are arranged on an upper right side of the rear surface of the camera body 10, and the cross-shaped button 117f, OK button 117g and menu button 117h are arranged below these buttons. The cross-shaped button 117f causes a cursor to move on the screen, on menu screens or the like displayed on the liquid crystal monitor 115a, and it is possible to confirm items selected using the cursor if the OK button 117g is pressed down. A menu screen is displayed if the menu button 117h is operated.

Figure 3:
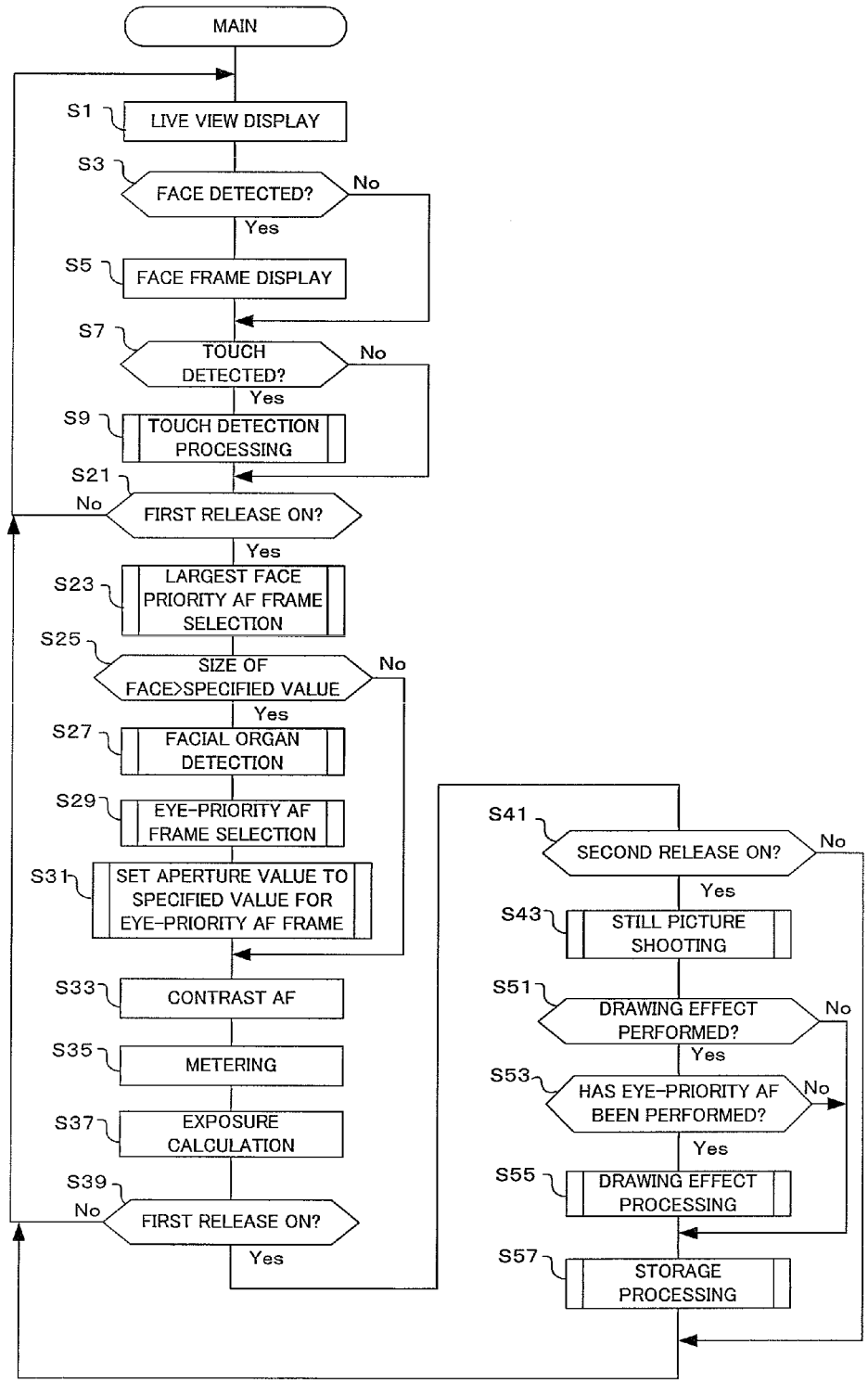
FIG. 3 is a flowchart showing main operation of the camera of one embodiment of the present invention.

Next, operation of the camera 100 of this embodiment will be described using the flowchart shown in FIG. 3. This processing flow, and respective processing flows that will be described later, are executed by the system control section 116 in accordance with programs stored in the non-volatile memory 118. The processing flow shown in FIG. 3 is the main routine operation. Execution of this main routine commences once the power supply button 117a of the operation section 117 is turned on.

If operation of the main routine commences, live view display is first carried out (S1). With the live view display, image signals output from the image sensor 107 are subjected to image processing for live view display by the image processing section 111, and this image processed image data is displayed on the liquid crystal monitor 115a of the display section 115. The photographer determines composition of a still picture or movie by looking at this live view display, and determines when to press the release button.

If live view display has been carried out, face detection is next carried out (S3). In this step, the image processing section 111 detects whether a face is contained in the subject image by various methods such as a matching method or face color etc., using image data.

Figure 4A:
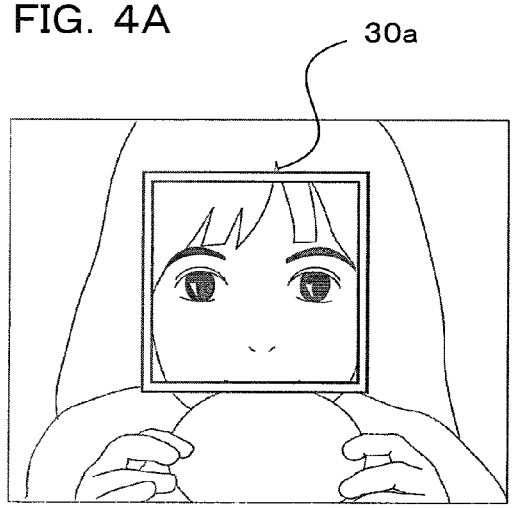
FIG. 4A and FIG. 4B show an eye priority AF frame selection operation of the camera of one embodiment of the present invention.
Figure 4B:
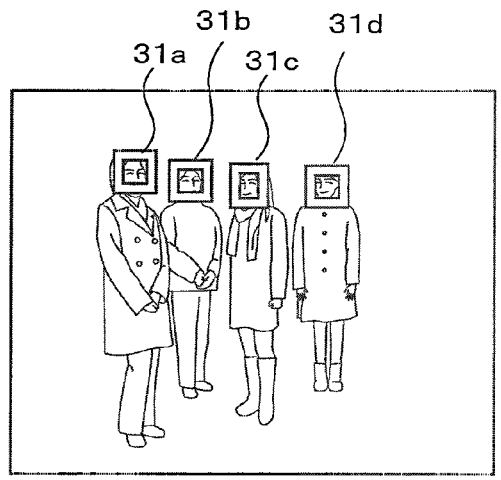

If the result of the determination in step S3 is that it has been possible to carry out face detection, face frame display is next carried out (S5). As shown, for example, in FIG. 4A and FIG. 4B, display of this face frame is carried out by overlaying a white frame showing part of the face of the subject, such as the face frames 30a, 31a-31d, on the subject image displayed on the liquid crystal monitor 115a. The face frame is not limited to a white frame, and another display method is possible provided part of a face is displayed.

Once display of the face frame has been carried out in step S5, or if the result of determination in step S3 was that a face could not be detected, it is next determined whether or not touch detection has taken place (S7). In the case where it is user's intention to carry out eye priority AF, focus on one eye, and carry out image processing for an eye drawing effect to feather the eye that has not been focused on, an eye drawing icon 115b (refer to FIG. 9A) displayed on the screen of the liquid crystal monitor 115a is touched, and eye drawing effect mode is set. In this step it is therefore determined whether or not the screen of the liquid crystal monitor 115a has been touched.

If the result of determination in step S7 is that touch has been detected, touch detection processing is next carried out (S9). Here, whether or not a touched position is an eye drawing icon 115b, and if the eye drawing icon 115b was touched, setting is carried out for an eye drawing effect, such as feathering position and feathering position. Detailed operation of this touch detection processing will be described later using FIG. 8.

If touch detection processing has been carried out in step S9, or if the result of determination in step S7 was that there was no touch, it is next determined whether or not there has been a first release operation (S21). Here it is determined whether or not the release button 117b of the operation section 117 has been pressed down halfway to turn on the first release switch. If the result of this determination is that the first release operation has not been performed, processing returns to step S1, and live view display etc. is executed.

Figure 5A:
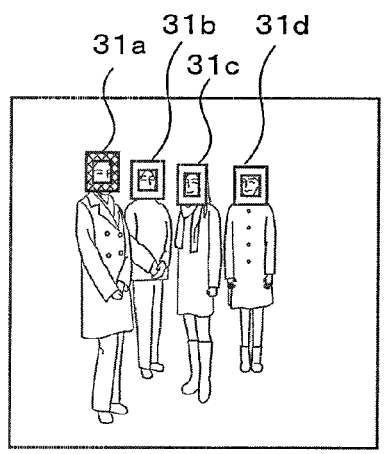
FIG. 5A and FIG. 5B are drawings showing display of frames for a face when eyes have been detected, with the camera of one embodiment of the present invention.

If the result of determination in step S21 is that the first release operation has been carried out, the largest face priority AF frame is selected (S23). Here, the face having the largest size, from among faces that have been detected in the face detection of step S3, is selected, and a face priority AF frame is superimposed on this face in the subject image. As shown in FIG. 5A, for example, in the case where a plurality of face frames 31a-31d have been detected, the largest detected face is detected, and this face is selected as the face priority AF frame. In order to be able to differentiate the selected face frame 31a as the selected face priority AF frame, it is preferable to make it identifiable by changing the color of the frame etc.

Once the largest face priority AF frame has been selected in step S23, it is next determined whether or not the size of the face is larger than a specified value (S25). Here, it is determined whether or not the largest face that was selected in step S23 is larger than a specified value. If a face is small it will be difficult to detect a portion of the eyes from within the facial organs, and so the specified value for determination in this step is preferably a numerical value that enables determination as to whether or not the face is of such a size that eyes can be detected. Also, as the specified value used in determination, it is possible to use a value such that variation in focus over a distance of the depth of a face (about 10 cm), namely a Bokeh state, becomes large, as a fixed value. Also, since the out of focus Bokeh state varies depending on lens focal length, distance from the camera to the face, and aperture value etc., it is also possible to determine the specified value by calculation based on these values instead of using a fixed value.

If the result of determination in step S25 is that the size of the face is larger than the specified value, facial organ detection is carried out (S27). In this step the image processing section 111 detects facial organs, namely eyes, nose mouth, corners of the mouth etc., of a face of a person within a subject based on image data from the image sensor 107. Also, when eyes have been detected, the left and right eyes are respectively detected.

Figure 5B:
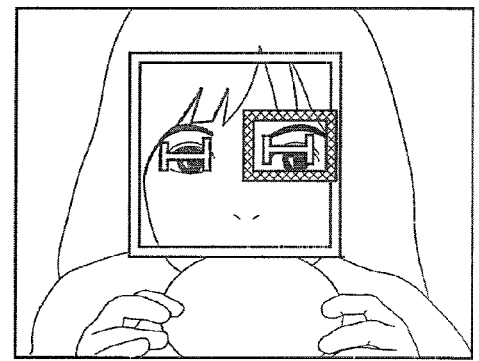

If facial organ detection has been carried out in step S27, an eye-priority AF frame is next selected (S29). In selection of an eye-priority AF frame the larger of the left and right eyes is selected. It is possible to make the size of the eye a distance between the lateral canthus and the medial canthus, as shown in FIG. 5B. The size of the eye can also be determined based on the diameter of the iris (pupil). The eye-priority AF frame is set so as to focus on the eye portion.

Figure 7:
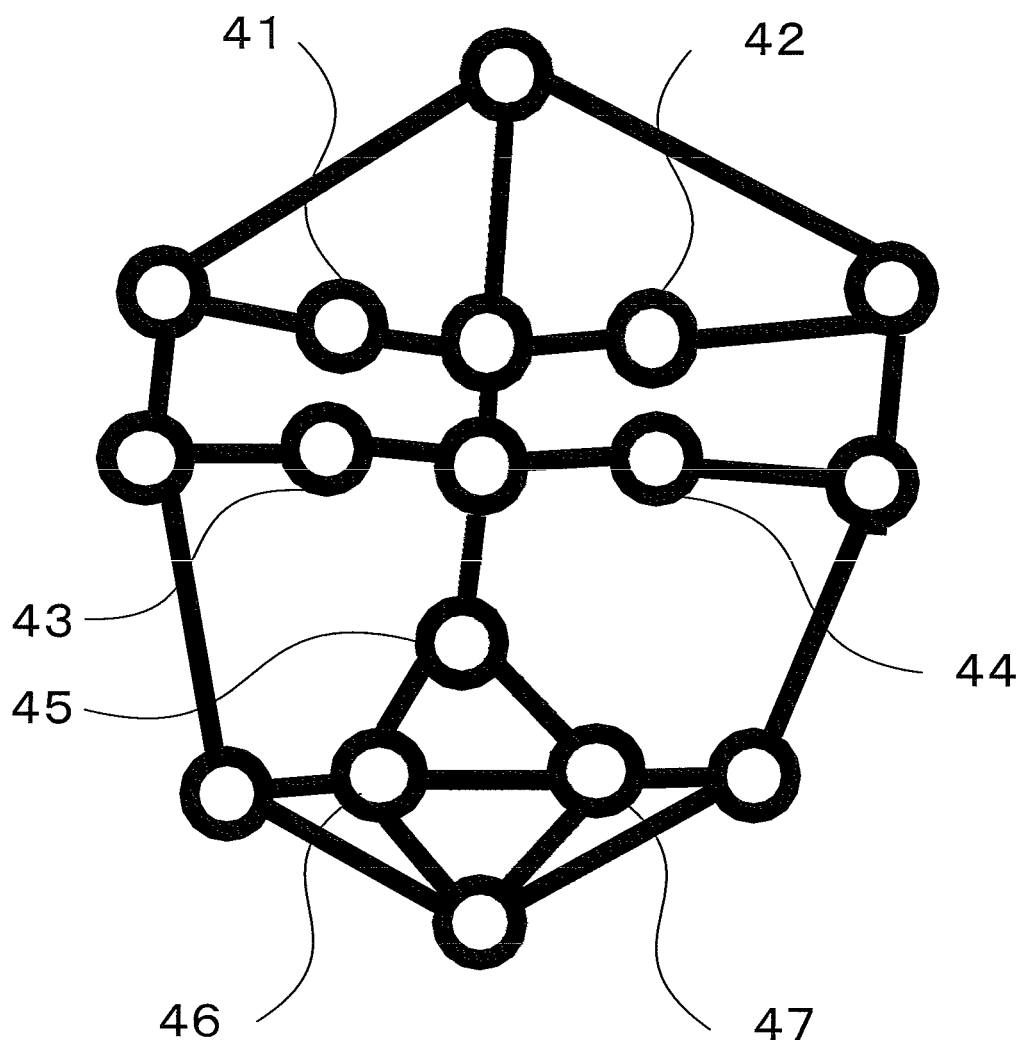
FIG. 7 is a drawing showing an example of a wire frame created by detecting points on a face at the time of organ detection, with the camera of one embodiment of the present invention.

Also, turning of the face is first detected and either a left or right eye-priority AF frame is selected in accordance with the face turning, and in the event that the face is turned through a specified angle or more, eye-priority AF frame may be selected using the distance between the lateral canthus and medial canthus. The image processing section 111 detects node points such as eyes, mouth, nose, chin, forehead, eyebrows, brow, etc. by facial organ detection, as shown in FIG. 7, forms a wireframe by connecting these points, as shown in FIG. 6A and FIG. 6B, and calculates an angle for the direction in which the face is facing based on this wireframe. As node points there are, as shown in FIG. 7, a left eyebrow node point 41, right eyebrow node point 42, left eye node point 43, right eyebrow node point 44, nose node point 45, left mouth corner node point 46, and right mouth corner node point 47 etc.

When determining whether the face is turned to the right or to the left, with the example shown in FIG. 6A a centerline passing through the forehead, eyebrows, nose and chin is off-center to the left with respect to a line for the shape of the face, and so turning to the left is determined, and it is possible to calculate an angle based on how the centerline is offset. Also, with the example shown in FIG. 6B a centerline passing through the forehead, eyebrows, nose and chin is substantially in the middle with respect to a line for the shape of the face, and so it is determined that the subject is face-on.

Also, the closer eye may be determined simply by turning of the face. For example, in the case where turning of the face is to the right, the eye-priority AF frame to the left is selected. Since a person who is the subject is turned to the right, from the observer's viewpoint, the left eye is facing towards the camera and for this reason the left eye priority AF frame is selected. On the other hand, if the face is turned to the left, an eye priority AF frame of the right eye, from the observer's viewpoint, is selected. Since a person who is the subject is turned to the left, from the observer's viewpoint, the right eye is facing towards the camera and for this reason the right eye priority AF frame is selected.

From a practical viewpoint, the specified value in step S25 may be set to a value such that it is possible to detect whether or not the eye priority AF frame is the same size or larger than a face in a head and shoulders type photograph, so that the eye priority AF frame does not become too small. Also, at the time of displaying the eye priority AF frame, it is possible to change the aspect ratio of the eye priority AF frame and the face priority AF frame so that they can be discriminated at a glance. Since a face frame is normally shown in a square shape, the eye-priority AF frame may be made a horizontally long rectangle.

If an eye-priority AF frame has been selected in step S29, then aperture value is next set to a specified value for the eye-priority AF frame (S31). When setting the eye-priority AF frame and focusing on the eye, the diaphragm 103 is set to its wide-open value. It is also possible to set to an aperture value that is close to the wide-open value, instead of the wide-open value.

If the aperture value has been set to the specified value for the eye-priority AF frame in step S31, or if the result of determination in step S25 was that the size of the face was smaller than a specified value, contrast AF is next carried out (S33). Here, the AF processing section 113 acquires a contrast value obtained by integrating a high frequency component of image data, using image data of an eye-priority AF frame that was selected in step S29, or image data within the largest face-priority AF frame that was selected in step S23 in the case where an eye-priority AF frame has not been selected. The system control section 116 carries out focus adjustment control to move the photographing lens 101, by means of the lens control section 102, so that the contrast value becomes a peak value.

Once contrast AF has been carried out, photometry is carried out (S35). Here, subject brightness is obtained using image data for a portion in which an eye priority AF frame or a largest face priority AF frame has been selected. In cases where it is desired to obtain correct exposure for an entire face, even in the case where an eye priority AF frame has been selected, it is also possible to obtain, as a photometry value, subject brightness using image data for a portion of a face frame of a face in which an eye priority AF frame has been selected.

Once photometry has been carried out, exposure calculation is carried out (S37). Using the subject brightness that was obtained in step S35, the system control section 116 calculates exposure control values such as shutter speed, aperture value, ISO sensitivity etc. to obtain correct exposure, by means of APEX calculation or table reference. If an eye drawing effect has been selected on a menu screen, then shutter speed and ISO sensitivity to achieve correct exposure are calculated based on an aperture value that was set in step S31.

Once exposure calculation has been carried out, it is next determined whether or not the first release operation is continuing (S39). If the release button 117b is pressed down half way in step S21, processing advances to step S13 and after, but whether or not the half pressing of the release button 117b is continuing is also determined at the time of determination in step S39. If the result of this determination is that the first release operation is not continuing, processing returns to step S1 as this means that a finger has been taken off the release button 117b.

On the other hand, if the result of determination in step S39 was that the first release operation is continuing, it is next determined whether or not a second release operation has taken place (S41). Here it is determined whether or not the release button 117b of the operation section 117 has been pressed down fully to turn on the second release switch. If the result of this determination is that there has not been a second release operation, processing returns to step S1.

If the result of the determination in step S41 is that a second release operation was performed, still picture shooting is carried out next (S43). Here, image data for a still image from the image sensor 107 is acquired. If focusing on an eye using the eye-priority AF section has been carried out by the AF processing section 113 and the system control section 116, an aperture value at the time of exposure is set in the vicinity of a wide-open F value by an aperture value setting section constituted by the diaphragm control section 104 and the system control section 116.

Once still picture shooting as been carried out, it is next determined whether or not a eye drawing effect will be carried out for this shooting (S51). In the case where eye drawing effect mode has been set on the menu screen, then since image processing for the eye drawing effect is carried out after shooting of a still picture, in this step it is determined whether or not the eye drawing effect mode is set.

If the result of determination in step S51 is that an eye drawing effect will be carried out, it next determined whether or not eye-priority AF has been set (S53). Here, when contrast AF has been carried out in step S33 it is determined whether or not focusing was carried out for the subject of the eye-priority AF frame.

If the result of the decision in step S53 was that eye-priority AF was carried out, next eye drawing effect processing is carried out (S55). Here, image processing for an eye drawing effect to feather an image such as around an eye that has been focused on or the eye that has been focused on etc. is carried out. Detailed operation of this eye drawing effect processing will be described later using FIG. 14.

If the eye drawing effect processing has been carried out in step S55, or if the result of determination in step S53 was that eye-priority AF was not performed, or if the result of determination in step S51 was that an eye drawing effect will not be carried out, storage processing is next carried out (S57). Here, image data that was acquired in step S43, or, in the case where eye drawing effect processing was carried out, image data that has already been subjected to feathering image processing, is stored in external memory 114. Once the storage processing has been carried out, processing returns to step S1.

In this manner, with this embodiment eyes are detected at the time of facial organ detection from a formed digital image (S27), an eye that was detected at that time is focused on (S29, S33), and image processing to feather around the eye that has been focused on is carried out for the digital image (S55). Also, with this embodiment, left and right eyes are respectively detected at the time of carrying out facial organ detection (S27), and the closer of the left and right eyes, namely the one that is largest, is selected (S29), an action to focus on the selected eye is carried out (S33), and image processing to feather the eye that was not selected is carried out (S55).

Figure 8:
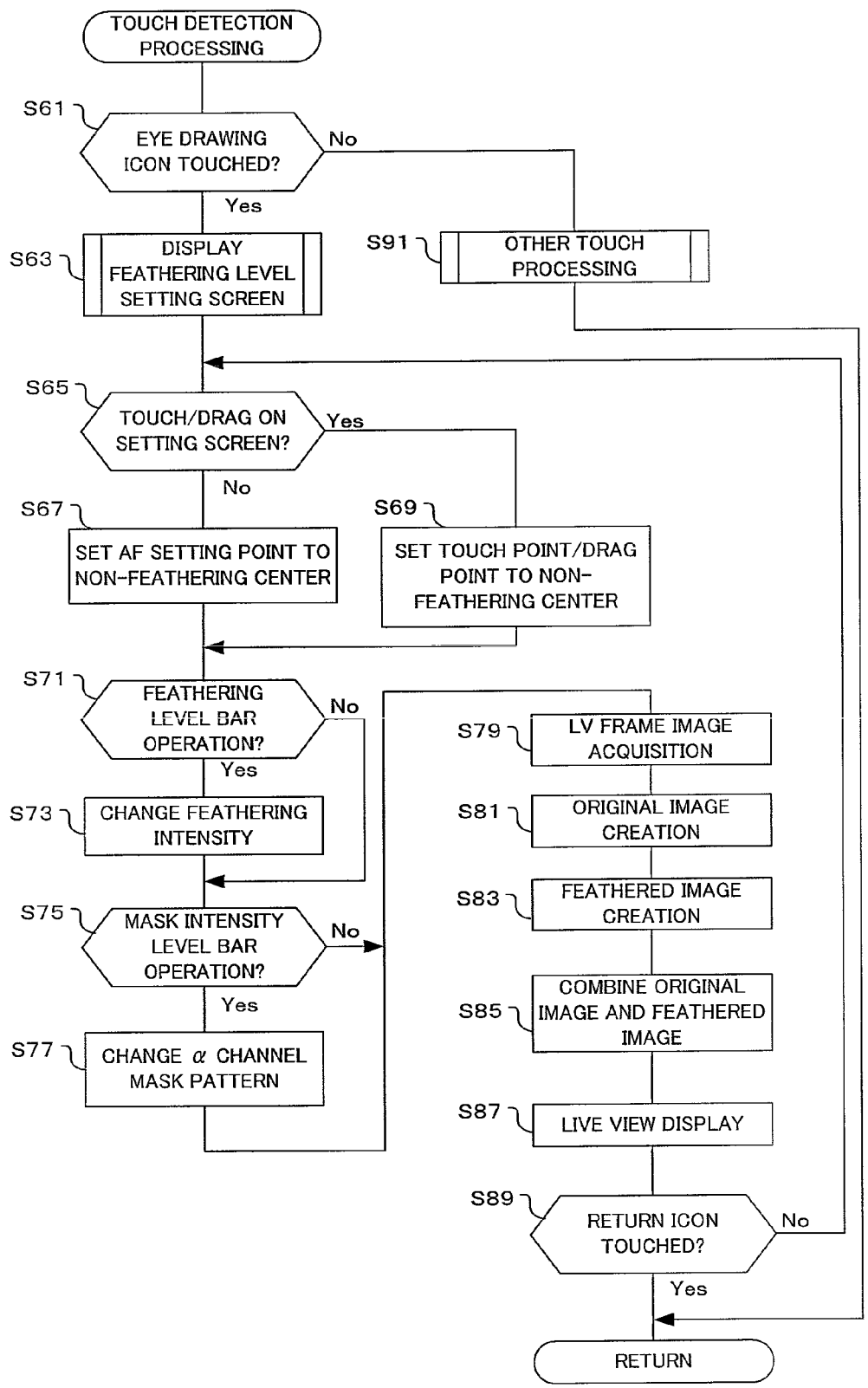
FIG. 8 is a flowchart showing operation of touch detection processing for the camera of the one embodiment of the present invention.

Next, touch detection processing in step S9 during live view display before a first release operation is carried out will be described using the flowchart shown in FIG. 8. The flow for touch detection processing is started by touching a monitor screen of the liquid crystal monitor 115a, as described above.

If the flow for touch detection processing is entered, it is first determined whether or not an eye drawing icon 115b has been touched (S61). As was described previously, setting of the eye drawing effect mode by the user is carried out by touching the eye drawing icon 115b (refer to FIG. 9A) displayed on the liquid crystal monitor 115a, and so in this step determination is based on a detection signal for a touched position from the display section 115. If the result of this determination is that the eye drawing icon 115b has not been touched, other touch processing is carried out (S91). In the case where a screen other than the eye drawing icon 115b has been touched during live view display, processing corresponding to the touched position is carried out, and once processing is completed the original flow is returned to.

If the result of determination in step S61 is that the eye drawing icon 115b has been touched, a feathering level setting screen is next displayed (S63). Here, the feathering level guide 115c, feathering level bar 115d, mask intensity level guide 115e, mask intensity level bar 115f and return icon 115g shown in FIG. 9B are displayed. The feathering level guide 115c and feathering level bar 115d are icons for setting feathering level, and feathering intensity is set by moving the feathering level bar 115d along the feathering level guide 115c with a touch operation.

The mask intensity level guide 115e and mask intensity level bar 115f are icons for setting a channel mask patterns, and steepness of change in feathering and width of an area where that feathering is performed are set by moving the mask intensity level bar 115f along the mask intensity guide 115e with a touch operation. By touching the return icon 115g, the original processing flow is returned to from the touch detection processing flow.

If a feathering setting level screen is displayed, it is next determined whether or not there has been a touch/drag operation on the setting screen (S65). As a region in which feathering processing is not carried out, it is possible to set an AF setting point, or for the user to set a region that has been touched/dragged on the screen of the liquid crystal monitor 115a (refer to FIG. 12A and FIG. 12B). In this step, whether or not the user has set a region that is not subjected to feathering processing is determined based on a touched position detection signal from the display section 115.

If the result of determination in step S65 is that there has been no touch/drag on the setting screen, and AF setting point is set to a non-feathering center (S67). The position of the face-priority AF frame that was set in step S5 (AF setting point) is set so that feathering processing is not carried out. On the other hand, if the result of determination in step S65 is that touch/drag was carried out on the setting screen, a touch point or drag point is set to a non-feathering center (S69).

If setting of a non-feathering center has been carried out in steps S67 or S69, it is next determined whether or not a feathering level bar operation has been performed (S71). Whether or not the previously described feathering level bar 115d has been moved by a touch operation is determined based on a detection signal for touched position from the display section 115.

Figure 10A:
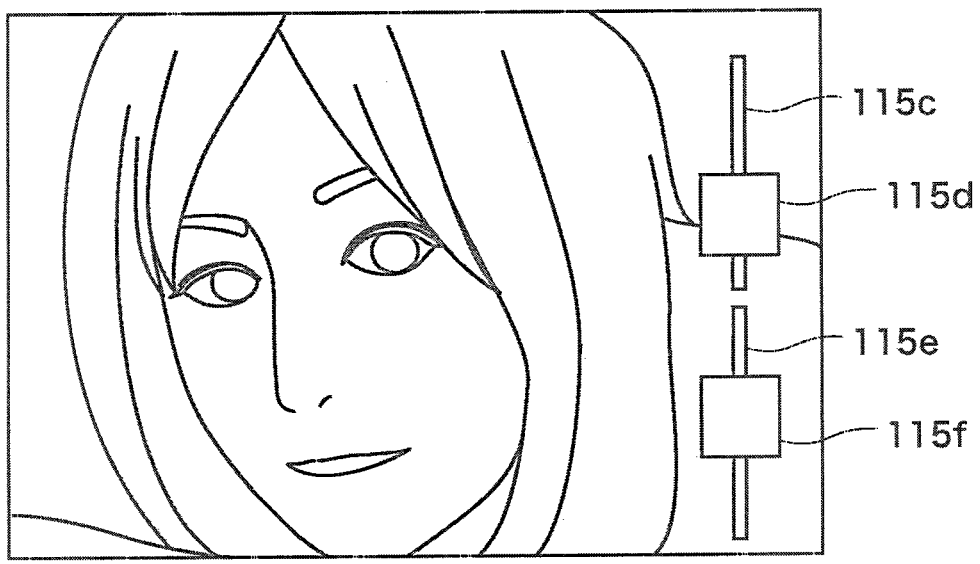
FIG. 10A and FIG. 10B are drawings showing examples of a feathered image that has been created using a feathering level bar, with one embodiment of the present invention.
Figure 10B:
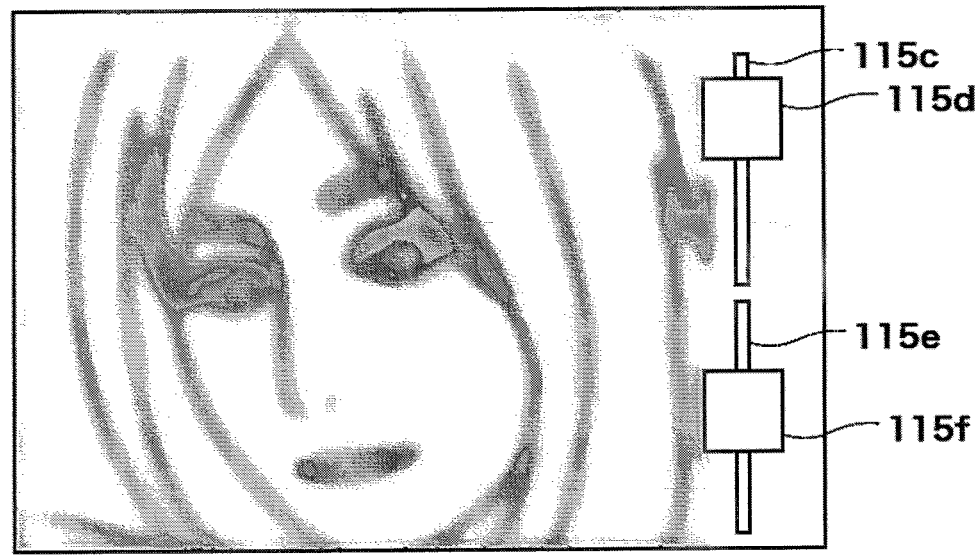

If the result of determination in step S71 is that a feathering level bar operation has been performed, the feathering intensity is changed (S73). With change of feathering intensity, for example, by sliding the feathering level bar 115d in the focused image shown in FIG. 10A it is possible to vary the blurred states as shown in FIG. 10B.

If feathering intensity change has been carried out, or if the result of determination in step S71 was that the feathering level bar was not operated, it is next determined whether or not there has been a mask intensity level bar operation (S75). Whether or not the previously described mask intensity level bar 115f has been moved by a touch operation is determined based on a detection signal for touched position from the display section 115.

Figure 12A:
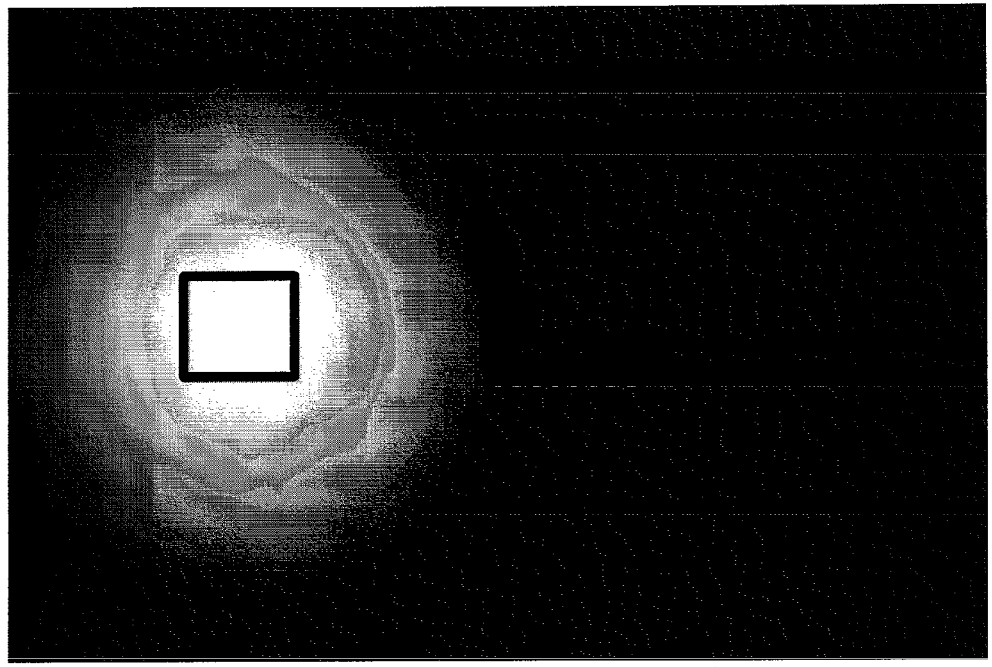
FIG. 12A and FIG. 12B are drawings showing other examples of an α channel mask pattern, with one embodiment of the present invention.
Figure 12B:
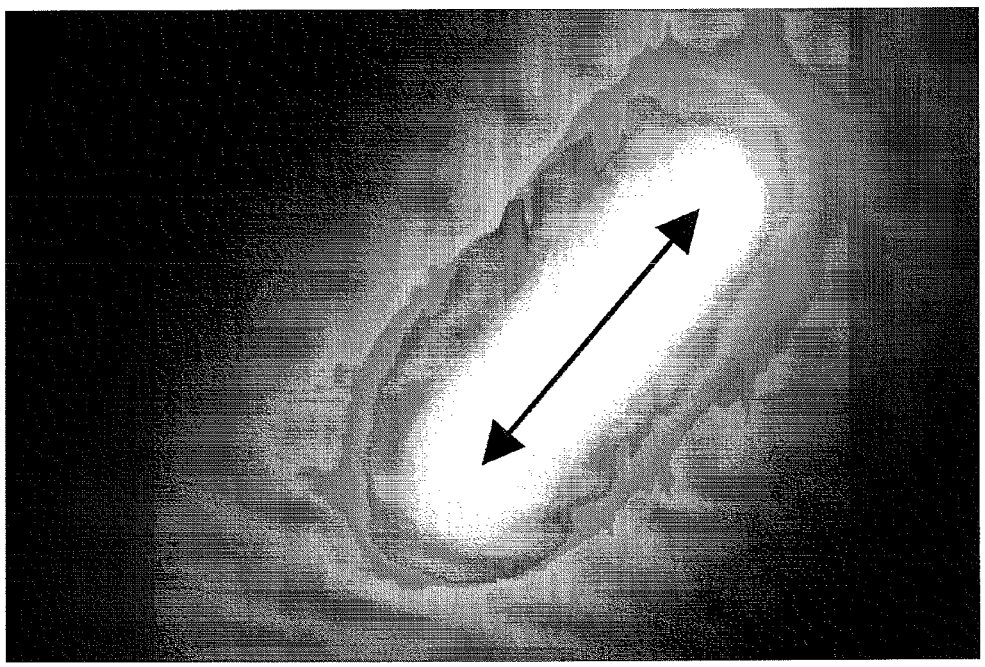

If the result of determination in step S75 is that the mask intensity level bar has been operated the α channel mask pattern is changed (S77). The α channel mask pattern is a mask that varies transparency, as shown in FIG. 12A and FIG. 12B, and is used at the time of combining a feathered image and an original image. Concentration of the α channel mask pattern represents transparency of the image. Black parts have less transparency, and white parts have greater transparency.

Figure 11A:
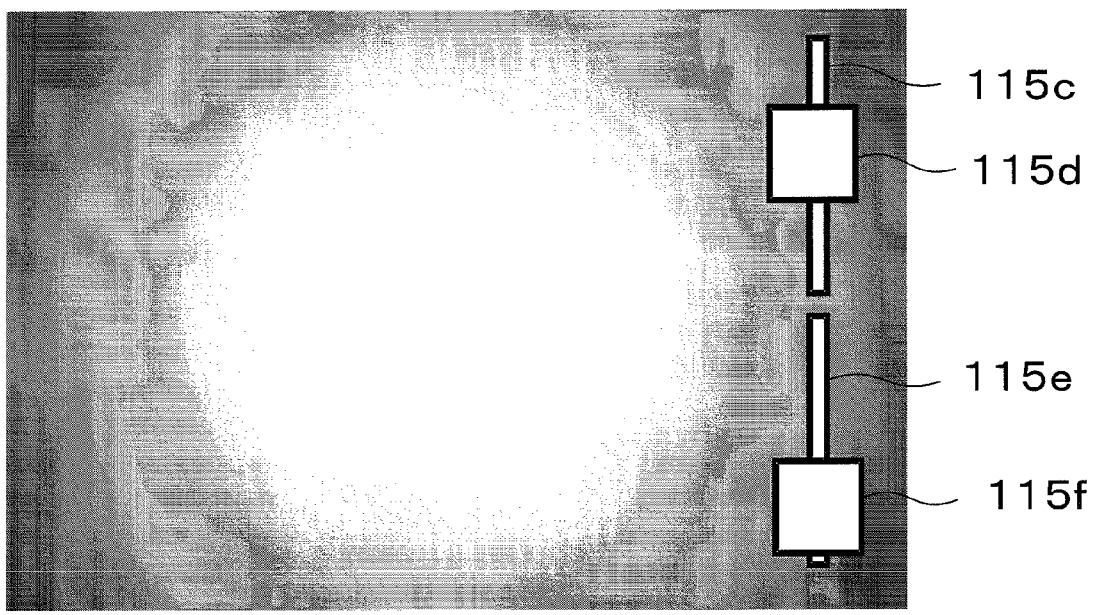
FIG. 11A and FIG. 11B are drawings showing examples of an α channel mask pattern that has been created using a mask intensity level bar, with one embodiment of the present invention.
Figure 11B:
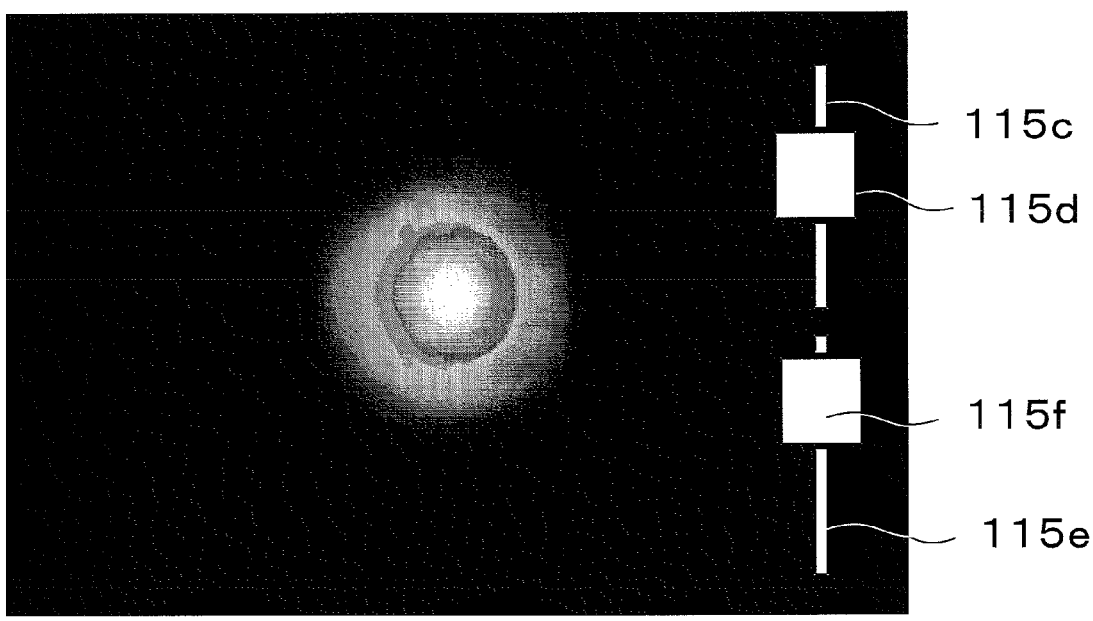

As shown in FIG. 11B, transparency of the α channel mask pattern is highest at the non-feathering center that was set in steps S67 or step S69. From this state, if the mask intensity level bar 115f is lowered then transparency of peripheral parts becomes high, as shown in FIG. 11A. In this way, the α channel mask pattern changes in accordance with the mask intensity level bar operation. Two α channel mask patterns are prepared, namely an original pattern prepared in accordance with a mask intensity level bar operation, and a reverse pattern that is this original pattern reversed. The original pattern is for the original image, and the reverse pattern is for the feathered image.

FIG. 11A and FIG. 11B are for the case where a point has been set as a feathering center, but the point in this case is not limited to the center of the screen. For example, as shown in FIG. 12A, in the case where an AF point or a point that has been touched by a finger is not at the center, it may be set to the periphery of the screen. Also, in a case such as where a line has been drawn in step S69 by a user dragging a finger on the screen of the liquid crystal monitor 115a, transparent parts of the α channel mask pattern become a line shape, as shown in FIG. 12B.

If the α channel mask pattern is changed in step S77, next a live view (LV) frame image is acquired (S79), and an original image is created (S81). Here, an image signal output from the image sensor 107 is subjected to image processing by the image processing section 111 for live view display, and this image is treated as the original image.

Once the original image is created, a feathered image is created (S83). Here, the image processing section 111 creates the feathered image in accordance with feathering intensity that was changed in step S73 (refer to FIG. 10B).

Once the feathered image is created, the original image and the feathered image are combined (S85). Here, as shown in FIG. 13, an image is formed by passing the original image that was created in step S81 through the α channel mask pattern 202 that was created in step S77. This passed image is the original image, and has portions that are in focus. Also, an image is formed by passing the feathered image that was created in step S83 through a mask 206 of a reverse pattern to the α channel mask pattern that was created in step S77. This passed image is the feathered image.

By combining images that have passed through the mask 202 and the mask 206, it is possible to acquire an image 209 to which a drawing effect has been imparted. This image 209 to which a drawing effect has been imparted has an area in the vicinity of the non-feathering center that was set in step S67 or S69 constituted by the focused original image, and parts that are separated from the non-feathering center constituted by the feathered image.

Once the image combination of step S85 has been carried out, live view display is carried out (S87). Here, an image that was acquired in step S79 and combined in step S85 is subjected to live view display on the display section 115.

If live view display has been carried out, it is next determined whether or not the return icon has been touched (S89). The return icon 115g (refer to FIG. 9B) is displayed on the display section 115 in step S63. Whether or not the user has touched this return icon 115g is determined based on a touched position detection signal from the display section 115.

If the result of determination in step S89 is that the icon has not been touched, processing returns to step S65. On the other hand, if the icon has been touched the original processing flow is returned to.

In this way, with such detection processing a screen for feathering level setting is displayed, to enable setting of a non-feathering center, and setting of feathering level and mask intensity level. It is therefore possible, while looking at a live view display image, for the user to carry out adjustments so as to obtain a drawing effect of feathering at the screen position they desire. However, in this embodiment, since facial organ detection has not yet been carried out, feathering processing is carried out with an AF point at the time when there is no face (not shown) or a touched point as a non-feathering center. Set values for feathering level and mask intensity level are also reflected in the eye drawing effect processing of step S55.

Figure 14:
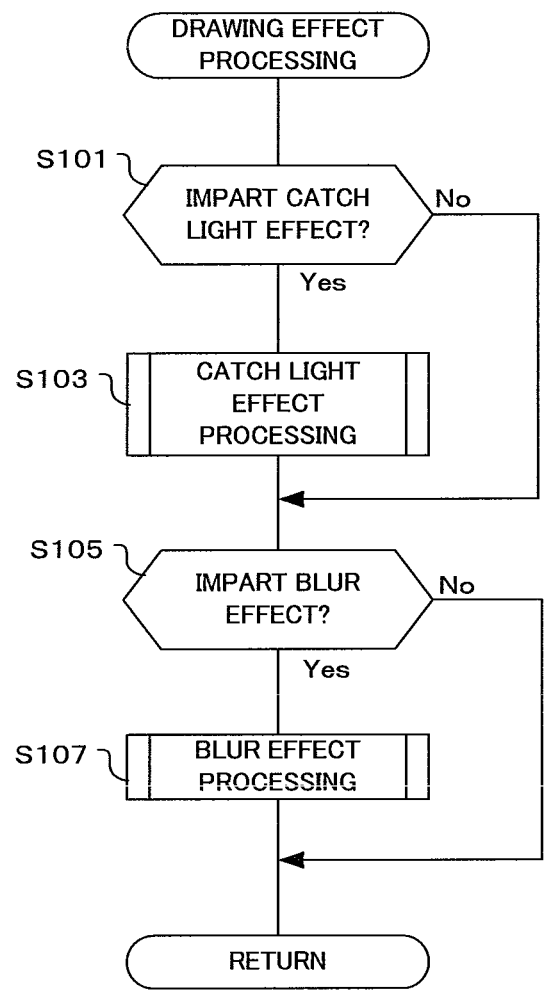
FIG. 14 is a flowchart showing operation of eye drawing effect processing of the camera of one embodiment of the present invention.

Next, detailed operation of the eye drawing effect processing of step S55 carried out after still picture shooting will be described using the flowchart shown in FIG. 14. If the eye drawing effect processing is entered, it is first determined whether or not imparting of a catch light effect is carried out (S101). Catch light is an effected image having a mark such as a cross, star, or crescent moon superimposed within the eyes of a person. As was described previously, imparting of a catch light effect is set on a menu screen (refer to FIG. 20A—FIG. 20G), and so in this step determination is based on settings of the menu screen.

If the result of determination in step S101 is to impart a catch light effect, catch light effect processing is next carried out (S103). Here, combination processing is carried out to create a catch light pattern, and superimpose the catch light pattern on the eyes of a person within a still image that was acquired in step S43 (refer to FIG. 3). Detailed operation of this catch light effect processing will be described later using FIG. 15.

If catch light effect processing has been carried out, or if the result of determination in step S101 was that the imparting of a catch light effect was not carried out, it is next determined whether or not to carry out imparting of a blurring effect (S105). Determination is based on whether or not a feathering effect has been selected on the menu screen. In the case where a feathering effect has been set, a blurring effect is imparted.

If the result of determination in step S105 was to impart a blurring effect, blurring effect processing is carried out (S107). Here, processing is carried out to impart a blurring effect to image data of the still image that was acquired in step S43. In the case where catch light effect processing was performed in step S103, a blurring effect is imparted to this image data.

Once blurring affects processing has been carried out, or if the result of determination in step S105 was not to impart a blurring effect, the eye drawing effect is completed and the original processing flow is returned to.

Figure 15:
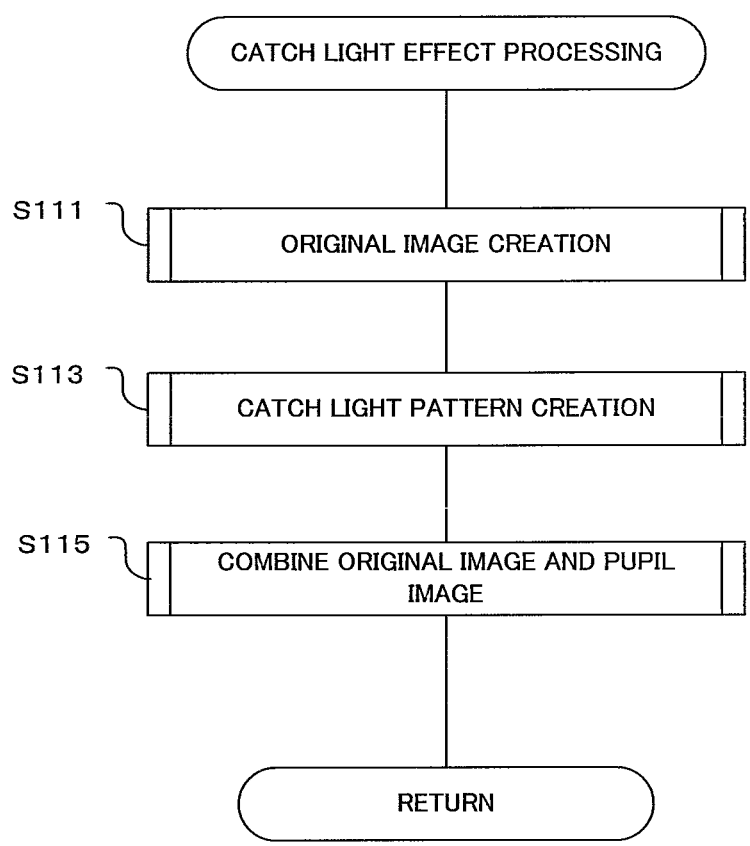
FIG. 15 is a flowchart showing operation of catch light effect processing with the camera of the one embodiment of the present invention.

Next, the catch light effect processing of step S103 will be described using the flowchart shown in FIG. 15. If the catch light effect processing flow is entered, an original image is created (S111). Here, image data of the still image that was acquired in step S43 is made the original image.

Once the original image has been created, next a catch light pattern is created (S113). Here a catch light pattern P, such as a star, cross, or crescent moon, is created in accordance with a blur amount of an eye or the size of a pupil. Details of the catch light pattern creation operation will be described later using FIG. 16.

Once the catch light pattern has been created, next the original image and a pupil image are combined (S115). Here, pupil images (PL, PR, which will be described later) incorporating the catch light pattern that was created in step S113 are combined with the original image that was created in step S111 (PL, PR, which will be described later). Once combination has been carried out the original processing flow is returned to.

Figure 16:
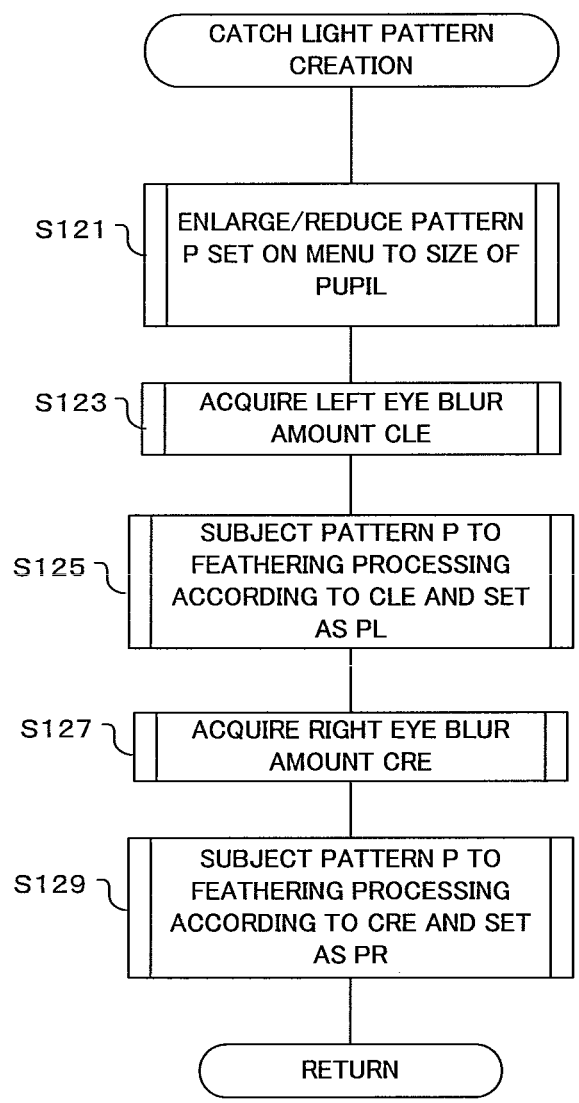
FIG. 16 is a flowchart showing a catch light pattern creation operation of the camera of the one embodiment of the present invention.

Next, the catch light pattern creation of step S113 will be described using the flowchart shown in FIG. 16. If the catch light pattern creation flow is entered, a pattern P that has been set on the menu is enlarged or reduced to the size of the pupil (S121). As was described previously, the catch light pattern is set on a menu screen, and the size of a pupil within an eye is detected by the image processing section 111.

Once enlargement/reduction of the pattern P has been carried out, left eye blur amount CLE is acquired (S123). Here, the AF processing section 113 calculates and acquires the blur amount CLE for a left eye. The reason for calculation of the blur amount CLE is as follows: while a pupil portion has a variation in blur amount depending on focused state of the photographing lens 103, a catch light pattern P that has been enlarged/reduced in step S121 is fixed at the blur amount in the focused state. In the case where the pupil portion is blurred, if the catch light pattern P is combined as is, a sense of discomfort will arise. For this reason, in this step blur amount CLE for the left eye is acquired, and in the next step feathering processing of the pattern is carried out by the image processing section 111.

If the blur amount CLE for the left eye has been acquired, next the pattern P is subjected to feathering processing in accordance with the left eye blur amount CLE, and set as the pattern PL (S125). Here, as described previously, the image processing section 111 performs feathering processing on the pattern P in accordance with left eye blur amount CLE so that the pattern P can be combined without a sense of discomfort. If feathering of the pattern P has been carried out, combination is carried out to superimpose the feathered pattern P on the left eye pupil.

If the pattern PL has been set, next right eye blur amount CRE is acquired (S127). Similarly to step S123, blur amount for the right eye CRE is acquired. Next, feathering processing on the pattern P is carried out in accordance with the blur amount CRE of the right eye, and set as a pattern PR (S129). Here, similarly to step S125, the pattern P is subjected to feathering processing in accordance with the right eye blur amount CRE. If feathering of the pattern P has been carried out, combination is carried out to superimpose the feathered pattern P on the right eye pupil. Once PR has been set the original processing flow is returned to.

Figure 17:
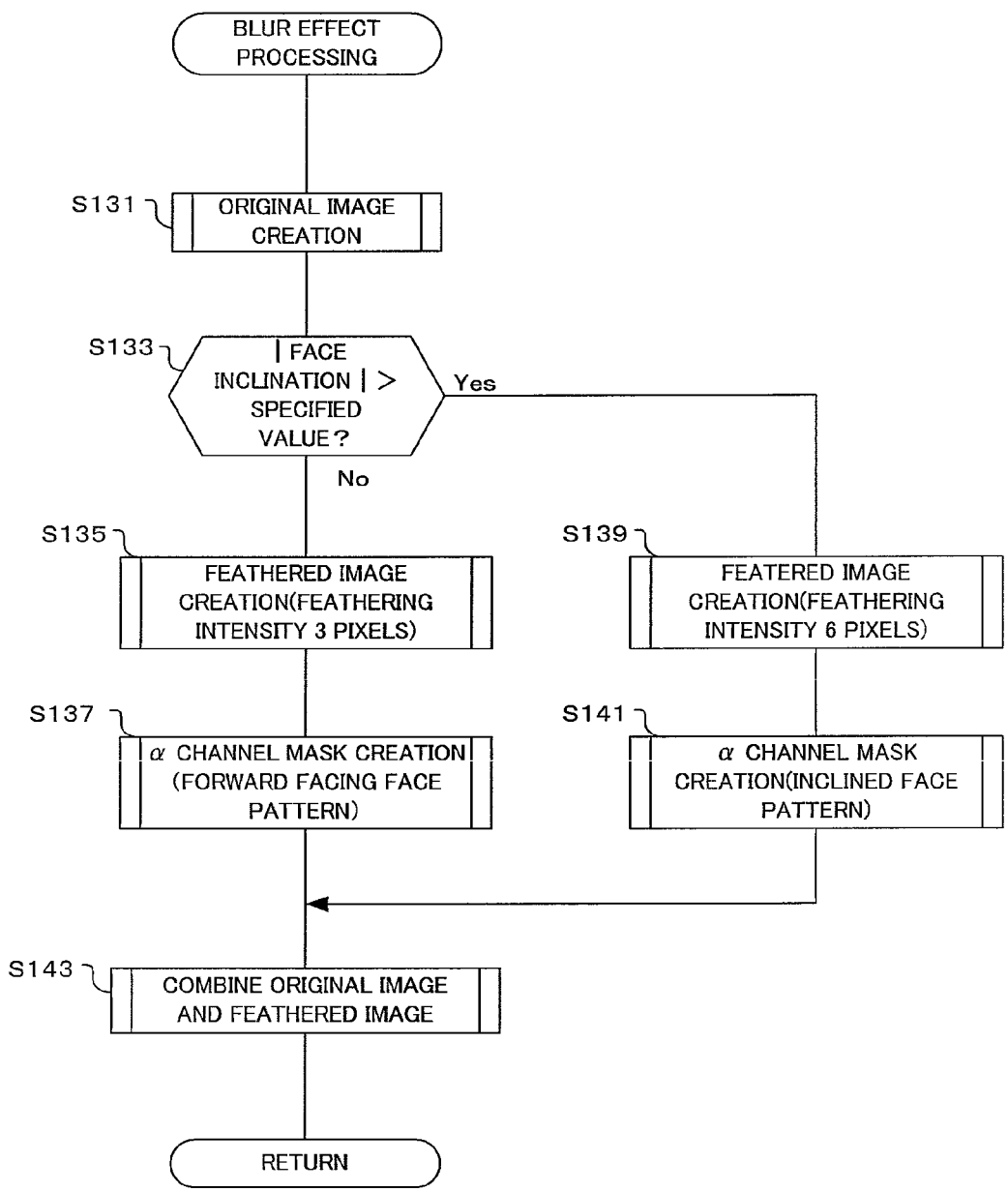
FIG. 17 is a flowchart showing operation of blurring effect processing of the camera of one embodiment of the present invention.

Next, the blur effect processing in step S107 (refer to FIG. 14) will be described using the flowchart shown in FIG. 17. If the blur effect processing flow is entered, creation of an original image is first carried out (S131). In the case where catch light effect processing is not performed in step S103 (refer to FIG. 14), still image data that was acquired in step S43 (refer to FIG. 3) is made an original image, or, in the case where catch light effect processing was carried out in step S103, image data that has already been subjected to catch light effect processing is made an original image.

If an original image has been created, it is next determined whether or not an absolute value for turning of the face is larger than a specified value (S133). Here the image processing section 111 carries out determination by connecting node points such as eyes, eyebrows, nose and mouth, as shown in FIG. 7, creating a wireframe, and calculating face turning based on this wireframe.

If the result of determination in step S133 is that the absolute value for face turning is smaller than a specified value, an image that has been feathered at a feathering intensity of 3 pixels is created (S135). The fact that face turning is smaller than the specified value means that a person who is a subject is facing generally to the front. In the case of facing to the front, there may be a sense of discomfort if feathering is made strong, and so a reference feathering intensity is made 3 pixels. Specifically, feathered pixels are within a range of 3 pixels, and in the case where feathering intensity is changed in step S73 (refer to FIG. 8), feathering intensity is changed with respect to this reference feathering intensity.

Figure 18A:
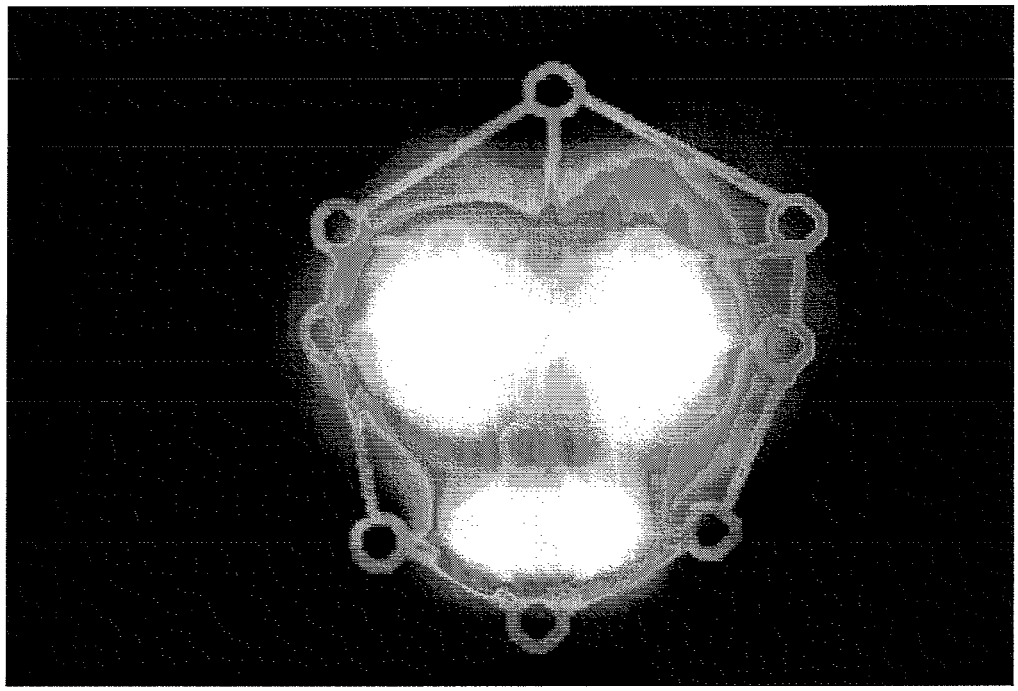
FIG. 18A and FIG. 18B are drawings showing examples of α channel masks in the case where a face is facing forward, with one embodiment of the present invention.
Figure 18B:
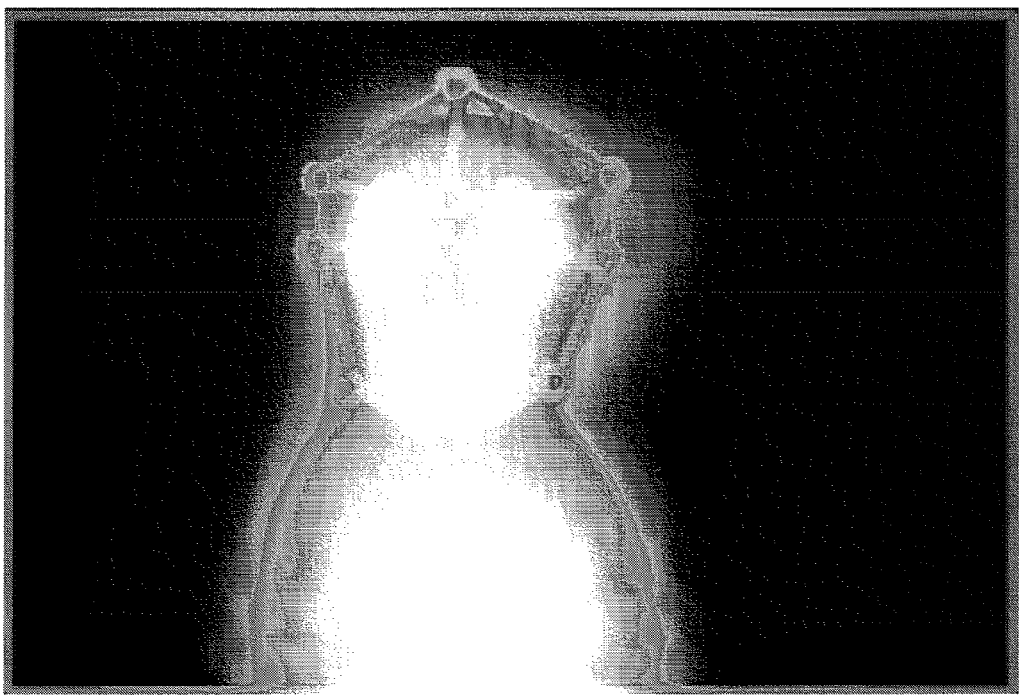

Once a feathered image has been created, an α channel mask for a forward facing face pattern is created (S137). An example of an α channel mask for a forward facing face is shown in FIG. 18A and FIG. 18B. In the case of facing forwards, feathering is performed with greater intensity with increasing distance from the center of a line joining both eyes of the face and the mouth. FIG. 18A is an α channel mask for the case where a face part is in close up, and FIG. 18B is an α channel mask for the case where a torso part is being photographed as well as the face. In the case of a forward facing subject, if the whole of the upper body is photographed there will be a feeling of discomfort if all parts other than the face are feathered, and so, as shown in FIG. 18B, an α channel mask is created so as to feather parts other than the person.

On the other hand, if the result of determination in step S133 is that the absolute value for face turning is larger than a specified value, an image that has been feathered at a feathering intensity of 6 pixels is created (S139). The fact that face turning is larger than the specified value means that a person who is a subject is turned to the side. In the case of being turned to the side, there is no feeling of discomfort even when feathering more strongly than at the time of facing forward, and so a reference feathering intensity is made 6 pixels. Specifically, in the case of feathering within the range of 6 pixels, and in the case where feathering intensity is changed in step S73 (refer to FIG. 8), feathering intensity is changed with respect to the reference feathering intensity.

Figure 19A:
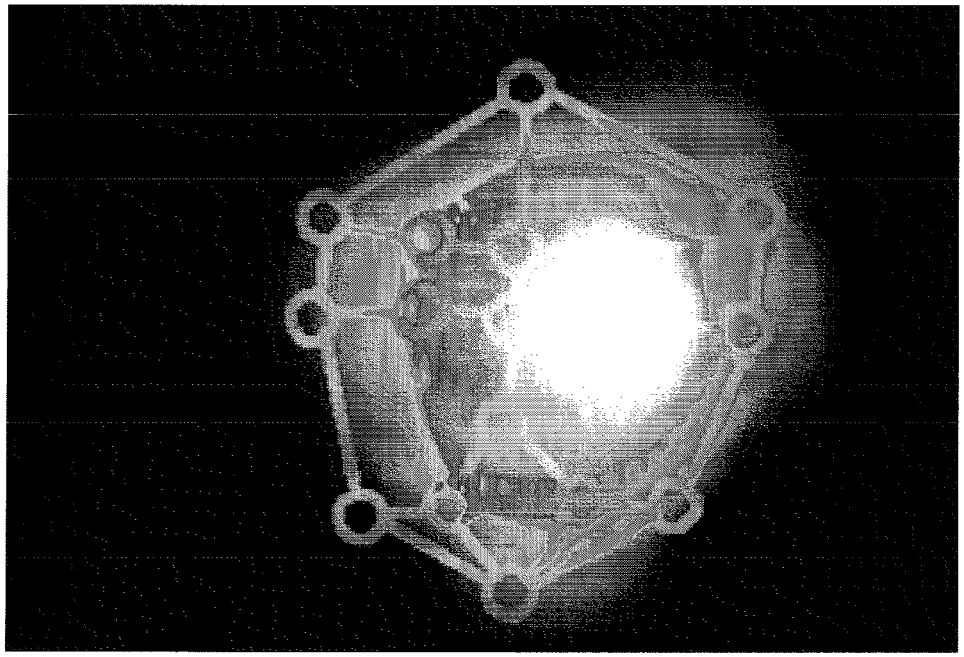
FIG. 19A and FIG. 19B are drawings showing examples of a channel masks in the case where a face is inclined to the front, with one embodiment of the present invention.
Figure 19B:
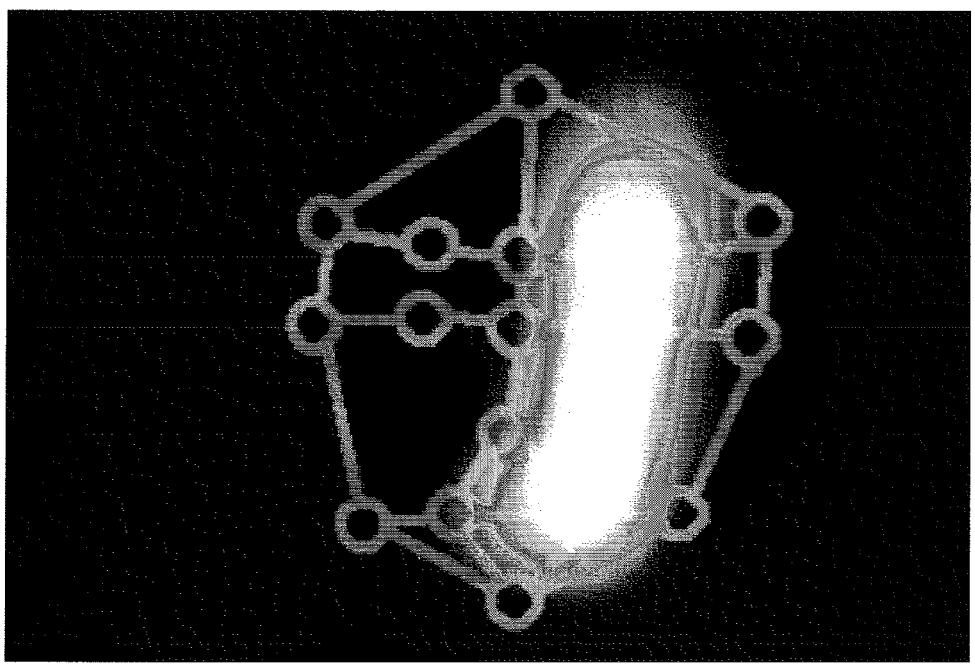

Once a feathered image has been created in step S139, an α channel mask for a turned sideways face pattern is created (S141). An example of an α channel mask for a turned sideways face pattern is shown in FIG. 19A and FIG. 19B. In the case of turning sideways, as shown in FIG. 19A, it is standard practice to create an α channel mask so that an eye that has been focused on becomes black around the center. However, as shown in FIG. 19B, a line that joins an eye and the mouth (corners of mouth) that have been focused on a may be blackened around the center, and is preferable as it results in an attractive photograph.

Once an α channel mask has been created in step S137 or S141, next the original image and the feathered image are combined (S143). Here, similarly to what was described with step S85 (refer to FIG. 8 and FIG. 13), an image is created by passing the original image that was created in step S131 through the α channel mask pattern 202 that was created in step S137 or S141. This passed image has focused portions within the original image. Also, an image is formed by passing the feathered image 201 that was created in step S135 or S139 through a mask 206 of a reverse pattern to the α channel mask pattern that was created in step S137 or S141. This passed image is the feathered image.

By combining images that have passed through the mask 202 and the mask 206, it is possible to acquire an image 209 to which a drawing effect has been imparted. As shown in FIG. 19B, if an α channel mask pattern having a line that joins a focused eye and the mouth (corners of the mouth) darkened around the center is used, it is possible to carry out image processing to feather around the region along a line that joins an eye that has been focused on and one corner of the mouth, of the left and right corners of the mouth, corresponding to the position of the eye that has been focused on.

In this way, with eye drawing effect processing and processing related to this eye drawing effect processing, in the case where eye drawing effect mode has been set, after still image capture, for an eye that has been focused on or a portion that has been designated by user, the acquired still image is kept and feathering processing is carried out around portions starting from a focus position or the designated position, in accordance with feathering intensity level and mask intensity level that have been set. Also, left and right eyes and mouth corners are detected from a captured digital image (refer to S27 of FIG. 3), the larger of the left and right eyes is selected (S29 of FIG. 3), an operation to focus on the selected eye is carried out (S33 of FIG. 3), and image processing is carried out to feather around a region that includes the eye that has been focused on and one mouth corner, of the left and right mouth corners, corresponding to the position of the eye that has been focused on (S141).

Next, effect setting for an eye drawing effect mode carried out on a customized menu screen will be described using FIG. 10A-FIG. 20G. FIG. 20A shows the appearance of a customized menu screen being displayed on the liquid crystal monitor 115a. If the user operates the cross-shaped button 117f, selects "eye drawing effect setting" with the cursor, and operates the OK button 117g, the screen changes to the eye drawing effect setting screen shown in FIG. 20B.

"Feathering effect", "catch light effect", "face makeup effect" are displayed on the eye drawing effect settings screen, and by operating the cross-shaped button 117f the cursor is moved and it is possible to designate respective effects. As shown in FIG. 20B, if the cursor is moved to "feathering effect" and one second elapses at that position, a comment representing the processing content for "feathering effect" is displayed, as shown in FIG. 20C.

Also, by operating the cross-shaped button 117f it is possible to designate "catch light effect", as shown in FIG. 20D, and if one second elapses at this position a comment representing the processing content for "catch light effect" is displayed, as shown in FIG. 20E.

Similarly, it is possible to designate "face makeup effect", as shown in FIG. 20F, by operating the cross-shaped button 117f, and if one second elapses at that position a comment representing the processing content for "face makeup effect" is displayed, as shown in FIG. 20G. The face makeup effect carries out image processing so in that the skin of a face portion appears smooth and the lips appear shiny. With this embodiment, for the designated effect names, a comment is displayed if one second elapses, but the time until display is not limited to one second and it may be longer or shorter.

In this way, it is possible to select various feathering effects and catch light effects in eye drawing effect setting of a menu screen.

Figure 21:
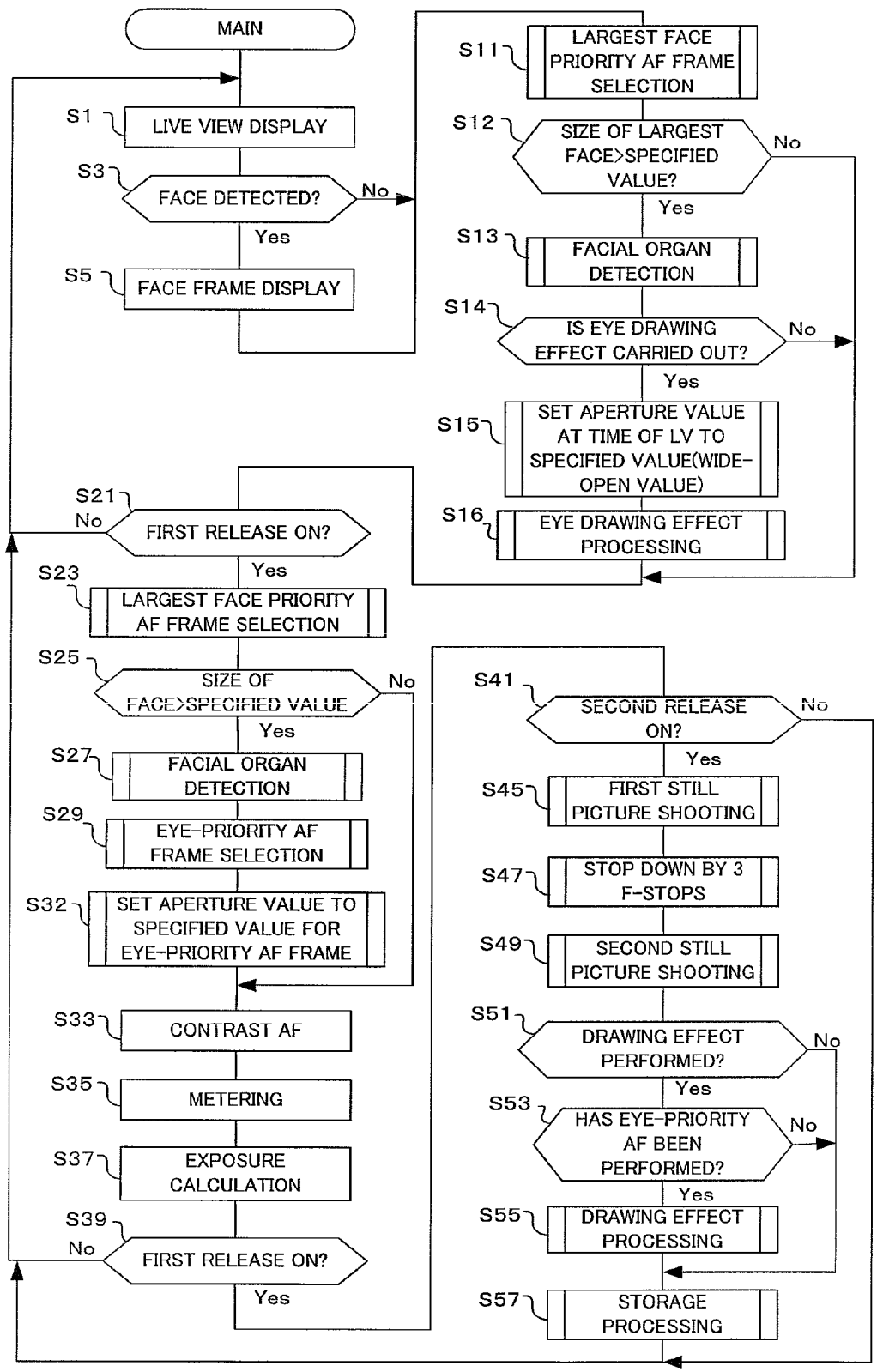
FIG. 21 is a flowchart showing main operation of a camera of a modified example of one embodiment of the present invention.

Next, a modified example of the main flow of one embodiment of the present invention will be described using the flowchart shown in FIG. 21. With the main flow of one embodiment that was shown in FIG. 3, facial organ detection was not carried out until the first release was turned on in step S21. This is because facial organ detection is generally difficult and requires a large amount of calculation, and so during live view display facial detection is not carried out and is only executed when the first release is turned on. However, in the case where processing speed for facial organ detection is fast it is also possible, as with this modified example, to carry out facial organ detection during live view display, as well as carrying out eye drawing effect processing and displaying the results of this processing.

Also, with the main flow of the one embodiment that was shown in FIG. 3, after the second release has been turned on in step S41, a still picture is taken once, but with this modified example after shooting of the first still image has been carried out the diaphragm 103 is stopped down by 3 F-stops, and second still image shooting is carried out after stopping down. An α channel mask pattern is then created from comparison of blur amounts of the first and second still images.

The main point of difference of this modified example is as was described above, and the processing flow shown in FIG. 21 will be described while focusing on this point of difference. The same step numbers are assigned to steps that carry out the same processing as in the main flow shown in FIG. 3. If the main flow is entered, live view display is carried out (S1), it is determined if it was possible to detect a face (S3), and if it was possible to detect a face display of a face frame is carried out (S5).

Then, similarly to steps S23-S27, selection of the largest face-priority AF frame is carried out (S11), it is determined whether or not the size of the largest face is larger than a specified value (S12), and if the result of this determination is larger facial organ detection is carried out (S13).

Once facial organ detection has been carried out, it is next determined whether or not an eye drawing effect has been carried out (S14). Here, it is determined whether or not eye drawing effect mode has been set on the menu screen. If the result of this determination is that eye drawing effect mode has been set, then next the aperture value at the time of live view (LV) is set to a specified value (S15). In the event that eye drawing effect mode has been set the aperture value is set to the wide-open value so as to make depth of field shallow to emphasize feathering. Since what is required is to make depth of field shallow, it is possible to set the aperture value to close to the wide-open value instead of the actual wide-open value.

If the aperture value has been set to the specified value, then next eye drawing effect processing is executed (S16). Here, processing for the eye drawing effect that was described using FIG. 14 is executed. As a result of this processing it is possible to observe a live view image to which the eye drawing effect has been applied, even during live view display.

Once the eye drawing effect processing has been carried out, then similarly to the main flow shown in FIG. 3, it is determined whether or not the first release is on (S21), and if the result of this determination is on, the largest face-priority AF frame is selected (S23), and it is determined whether or not the size of this face is larger than a specified value (S25). If the result of this determination is that the face is larger than the specified value, facial organ detection is carried out (S27), and an eye-priority AF frame is selected (S29).

Next, the aperture value at the time of shooting is set to a specified value (wide-open value) (S32). If the exposure mode is so-called program mode or auto mode, then since the aperture value corresponds to subject brightness, depth of field becomes deeper, resulting in an original image in which it is difficult to enhance blur. In order to avoid this, aperture value at the time of shooting is forcibly set to the wide-open value, so as to acquire an original image in which depth of field is made shallow to emphasize feathering. With this structure, aperture no longer varies with brightness, and since it is fixed at the wide-open aperture it is possible to unify and simplify subsequent feathering processing. Since it is preferable to make depth of field shallow, it is possible to set the aperture value to close to the wide open value instead of the actual wide open value, similarly to at the time of live view display.

Once the aperture value at the time of shooting has been set, contrast AF is carried out (S33), metering is carried out (S35), and exposure calculation is performed (S37). After that, it is determined whether or not the first release is on (S39), and if it is on it is then determined whether or not the second release is on (S41).

If the result of determination in step S41 is that the second release is on, first still picture shooting is carried out (S45). Here, image data for a first still image from the image sensor 107 is acquired. Next, the diaphragm 103 is stopped down by 3 stops (S47), and second still picture shooting is carried out (S49). Here, image data for a second still image from the image sensor 107 is acquired. Once the second still image shooting has been carried out, an α channel mask pattern is created from image data for the first and second still images. The stopping down of the diaphragm 103 is not limited to 3 steps. It is sufficient for the aperture to be stopped down by an amount that changes the amount of blurring.

In the one embodiment of the present invention, in steps S137 and S141 (refer to FIG. 17) an α channel mask pattern was created, but with this modified example the α channel mask pattern is created based on two images. Specifically, the α channel mask pattern is created so that a region where there is a lot of focus blur mainly uses a feathered image, and a region that is in focus mainly uses the original image.

Once the second still image shooting has been carried out in step S49, it is next determined whether or not an eye drawing effect is carried out (S51), if an eye drawing effect is not carried out it is determined whether or not eye priority AF was possible (S53), and if eye priority AF was possible eye drawing effect processing is carried out (S55). In the eye drawing effect, the α channel mask pattern used is that created from the first and second still images. Once eye drawing effect processing has been carried out, storage processing is carried out (S57), and once storage processing is completed processing returns to step S1.

In this way, with the main flow of the modified example of one embodiment of the present invention, eye drawing effect processing is carried out and a processing effect is displayed even during live view display. It is therefore possible to confirm an eye drawing effect even during live view display.

Also, with this modified example, shooting of first and second still pictures is carried out while changing the aperture value, and an α channel mask pattern is created from different blur amounts of the two still images. As a result, it is possible to automatically create an optimum α channel mask pattern.

If the above described eye priority AF is used with a camera fitted with a conventional medium telephoto, large diameter lens, Then since the subject field becomes shallow, it is possible to simply achieve a picture taking method with which the eyes of a person or animal are in sharp focus while peripheral face regions other than the eyes appear feathered. However, medium telephoto large diameter lenses are generally expensive, or very heavy, and so they cannot be used easily by a general user. With relatively cheap, small and lightweight lenses that a general user can readily purchase and handle, the wide-open F value is high, and depth of field is deep. For this reason it is not easy to obtain the above-described drawing effects even with a camera provided with an eye priority AF function.

Also, even if a conventional medium zoom wide diameter lens is fitted, with normal program shooting mode in the case where the environment is bright, aperture is small, depth of field is deep, and sufficient drawing effect cannot be obtained. In order to obtain a drawing effect in this type of situation, troublesome settings are necessary, such as deliberately fixing the aperture at the wide open F value, and controlling exposure using shutter speed, ISO sensitivity etc. It has also been considered to provide a mode where this troublesome setting is automatically set (for example portrait mode). However, this setting itself is troublesome to an entry-level user.

Also, the drawing effect is practically determined by a relationship between the distance from the camera to the main subject (eyes), and a distance between the camera and regions other than the main subject (eyes). For this reason, in the case of using a camera that is fitted with a conventional medium zoom large diameter lens also, there is a possibility that it will not be possible to obtain an expected effect, even if an entry-level user who is not in the habit of shooting close to a subject uses an expensive lens with the camera set to portrait mode.

Conversely, with the one embodiment and the modified example of the present invention, as has been described above, and AF region is set to an eye that has been detected from a digital image, the eye is focused on, and image processing is carried out to feather around the eye that has been focused on. As a result, even with a lens having a high wide-open F-number, it is possible to easily shoot an image having a drawing effect relating to the eyes without complicated settings.

Further, with the one embodiment and the modified example of the present invention, description has been given using a digital camera as a device for taking pictures, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc.

The present invention is not limited to the above-described embodiment, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device having an imaging section and capable of capturing a digital image, comprising:
   a facial organ detection section for detecting eyes from a digital image that has been taken by the imaging section;
   an eye-priority AF section for setting an AF region to a detected eye and focusing on the eye; and
   an image processing section for carrying out image processing on the digital image to feather the periphery of an eye that the eye-priority AF section has focused on, wherein
   the facial organ detection section detects facial organs from a digital image that has been captured by the imaging section, and determines inclination of a face based on the detected facial organs,
   the eye-priority AF section selects one eye based on the inclination of the face, and carries out focusing on the selected eye, and
   the image processing section carries out processing to feather an eye that has not been selected, and varies feathering strength in accordance with inclination of the face.

2. The imaging device of claim 1, wherein:
   the image processing section makes feathering intensity larger as inclination of the face increases from facing forward.

3. The imaging device of claim 1, wherein:
   the image processing section creates a feathered image by feathering the captured image, creates an α channel mask for the captured digital image and sets the eye that has been focused on to a transparent state, combines an image that has been formed by applying the α channel mask to the captured digital image with an image formed by applying a mask of a reverse pattern to the α channel mask to the feathered image, and carries out image processing to feather the eye that has not been selected.

4. The imaging device of claim 1, wherein:
   the facial organ detection section detects left and right eyes and corners of a mouth from a digital image that has been captured by the imaging section,
   the eye-priority AF section carries out an operation to focus on the selected eye, and
   the image processing section carries out image processing to feather around a region that contains the eye that has been focused on and one of either the left or right corners of the mouth corresponding to the position of the eye that has been focused on.

5. The imaging device of claim 4, wherein:
   the image processing section carries out image processing to feather with increased feathering intensity in accordance with a distance, on the image, from a region that contains the eye that the eye-priority AF section has focused on and one of either the left or right corners of the mouth corresponding to the position of the eye that has been focused on.

6. The imaging device of claim 4, wherein:
   the image processing section creates a feathered image by feathering the captured image, creates an α channel mask for the captured digital image and sets a region, that contains the eye that the eye-priority AF section has focused on and one of either the left or right corners of the mouth corresponding to the position of the eye that has been focused on, to a transparent state, combines an image that has been formed by applying the α channel mask to the captured digital image with an image formed by applying a mask of a reverse pattern to the α channel mask to the feathered image, and carries out image processing to feather the eye that has not been selected.

7. The imaging device of claim 1, wherein:
the image processing section carries out image processing to feather with an increased feathering intensity in accordance with a distance on the image from the eye that has been focused on by the eye-priority AF section.

8. The imaging device of claim 7, wherein:
the image processing section creates a feathered image by feathering the captured image, creates an α channel mask for the captured digital image and sets the eye that has been focused on to a transparent state while setting transparency lower in accordance with distance from the eye, combines an image that has been formed by applying the α channel mask to the captured digital image with an image formed by applying a mask of a reverse pattern to the α channel mask to the feathered image, and carries out image processing to feather the eye that has not been selected.

9. The imaging device of claim 1, wherein:
the image processing section creates a feathered image by feathering the captured image, creates an α channel mask for the captured digital image and sets the eye that has been focused on to a transparent state, combines an image that has been formed by applying the α channel mask to the captured digital image with an image formed by applying a mask of a reverse pattern to the α channel mask to the feathered image, and carries out image processing to feather around the eye that has been focused on.

10. The imaging device of claim 1, further comprising:
an aperture value setting section for setting the aperture value at the time of exposure to a specified value close to the wide-open F number, in the case where focusing has been carried out on the eye by the eye-priority AF section.

11. An imaging method, for an imaging device capable of capturing digital images by detecting an eye from a captured digital image, focusing on the detected eye, and carrying out image processing on the digital image to feather around the eye that has been focused on, comprising the steps of:

detecting facial organs from the digital image and determining inclination of a face based on the detected facial organs;
selecting one eye based on the inclination of the face, and carrying out focusing on the selected eye; and
carrying out processing to feather an eye that has not been selected, and varying feathering intensity in accordance with inclination of the face.

12. The imaging method of claim 11, wherein:
feathering intensity is made larger as inclination of the face increases from facing forward.

13. The imaging method of claim 11, wherein:
left and right eyes and corners of a mouth are detected from a captured image,
an operation to focus on the selected eye is carried out, and
image processing is carried out to feather around a region that contains the eye that has been focused on and one of either the left or right corners of the mouth corresponding to the position of the eye that has been focused on.

14. The imaging method of claim 13, wherein:
image processing is carried out to feather with increased feathering intensity in accordance with a distance, on the image, from a region that contains the eye that the eye-priority AF section has focused on and one of either the left or right corners of the mouth corresponding to the position of the eye that has been focused on.

15. The imaging method of claim 11, wherein:
image processing is carried out to feather with an increased feathering intensity in accordance with a distance on the image from the eye that has been focused on.

16. The imaging method of claim 11, wherein:
image processing is performed to create a feathered image by feathering the captured image, create an α channel mask for the captured digital image and set the eye that has been focused on to a transparent state, combine an image that has been formed by applying the α channel mask to the captured digital image with an image formed by applying a mask of a reverse pattern to the α channel mask to the feathered image, and feather around the eye that has been focused on.

17. The imaging device of claim 1, wherein varying the feathering strength in accordance with inclination of the face includes setting a feathering intensity of more pixels for an inclined face than for a forward-facing face.

18. The imaging method of claim 11, wherein the act of varying the feathering strength in accordance with inclination of the face includes setting a feathering intensity of more pixels for an inclined face than for a forward-facing face.

* * * * *